United States Patent
Dizdar et al.

(10) Patent No.: US 10,427,359 B2
(45) Date of Patent: Oct. 1, 2019

(54) ANCHORING A JOINING ELEMENT IN AN OBJECT

(71) Applicants: Woodwelding AG, Stansstad (CH); Inter IKEA Systems B.V., Delft (NL)

(72) Inventors: Nihat Dizdar, Osby (SE); Håkan Käll, Älmhult (SE); Pontus Håkansson, Malmö (SE); Muthumariappan Sankaran, Älmhult (SE); Mario Lehmann, Les Pommerats (CH); Jörg Mayer, Niederlenz (CH); Laurent Torriani, Lamboing (CH); Marcel Aeschlimann, Ligerz (CH)

(73) Assignees: WOODWELDING AG, Stansstad (CH); INTER IKEA SYSTEMS B.V., Delft (NL)

( * ) Notice: Subject to any disclaimer, the term of this patent is extended or adjusted under 35 U.S.C. 154(b) by 185 days.

(21) Appl. No.: 15/517,005

(22) PCT Filed: Oct. 2, 2015

(86) PCT No.: PCT/CH2015/000149
§ 371 (c)(1),
(2) Date: Apr. 5, 2017

(87) PCT Pub. No.: WO2016/054751
PCT Pub. Date: Apr. 14, 2016

(65) Prior Publication Data
US 2017/0297271 A1     Oct. 19, 2017

(30) Foreign Application Priority Data
Oct. 9, 2014 (CH) ........................... 1539/14

(51) Int. Cl.
*B32B 37/00* (2006.01)
*B29C 65/00* (2006.01)
(Continued)

(52) U.S. Cl.
CPC .......... *B29C 66/3032* (2013.01); *B29C 65/08* (2013.01); *B29C 65/565* (2013.01);
(Continued)

(58) Field of Classification Search
CPC ..... B29C 65/08; B29C 65/565; B29C 65/603; B29C 65/609; B29C 65/645;
(Continued)

(56) References Cited

U.S. PATENT DOCUMENTS

2015/0300389 A1\* 10/2015 Mayer ................ B29C 65/08
156/73.1

FOREIGN PATENT DOCUMENTS

DE    43 17 621     6/1994
JP    2009-295269   12/2009
(Continued)

OTHER PUBLICATIONS

International Preliminary Report on Patentability dated Apr. 11, 2017 (dated Apr. 11, 2017), Application No. PCT/CH2015/000149, 13 pages.

*Primary Examiner* — James D Sells
(74) *Attorney, Agent, or Firm* — Rankin, Hill & Clark LLP

(57) ABSTRACT

A joining element has an anchoring portion for in-depth anchoring in the object and a head portion arranged proximally of the anchoring portion with respect to an insertion axis. The head portion has a lateral outer surface that has a structure that is well-defined, especially within tight tolerances. The joining element is positioned relative to an object of a non-liquefiable material such that the anchoring portion reaches into an opening of the object or is placed adjacent a mouth thereof. Then, the joining element is pressed towards a distal direction, to press the anchoring portion into the opening, while mechanical vibration energy is coupled into
(Continued)

the joining element by a tool, in an amount and for a time sufficient for liquefaction of a portion of the thermoplastic material to cause interpenetration of the thermoplastic material into structures of the object.

44 Claims, 11 Drawing Sheets

(51) Int. Cl.
*B29C 65/08* (2006.01)
*B29C 65/60* (2006.01)
*B29C 65/64* (2006.01)
*B29C 65/78* (2006.01)
*B29C 65/56* (2006.01)
*B29K 101/12* (2006.01)

(52) U.S. Cl.
CPC .......... *B29C 65/603* (2013.01); *B29C 65/609* (2013.01); *B29C 65/645* (2013.01); *B29C 65/7808* (2013.01); *B29C 65/7844* (2013.01); *B29C 66/30321* (2013.01); *B29C 66/30325* (2013.01); *B29C 66/474* (2013.01); *B29C 66/727* (2013.01); *B29C 66/7392* (2013.01); *B29C 66/74* (2013.01); *B29C 66/7487* (2013.01); *B29C 66/8145* (2013.01); *B29C 66/81429* (2013.01); *B29C 66/9231* (2013.01); *B29C 66/9261* (2013.01); *B29C 66/71* (2013.01); *B29C 66/73161* (2013.01); *B29K 2101/12* (2013.01)

(58) Field of Classification Search
CPC ............ B29C 65/7808; B29C 65/7844; B29C 66/3032; B29C 66/30321; B29C 66/30325; B29C 66/474; B29C 66/727; B29C 66/7392; B29C 66/74
USPC ........................................................ 156/73.1
See application file for complete search history.

(56) References Cited

FOREIGN PATENT DOCUMENTS

| WO | 97/01432 | 1/1997 |
|----|----------|--------|
| WO | 98/42988 | 10/1998 |
| WO | 2008/080238 | 7/2008 |
| WO | 2008/095327 | 8/2008 |
| WO | 2013/104422 | 7/2013 |
| WO | 2014/075200 | 5/2014 |
| WO | 2015/181300 | 12/2015 |

* cited by examiner

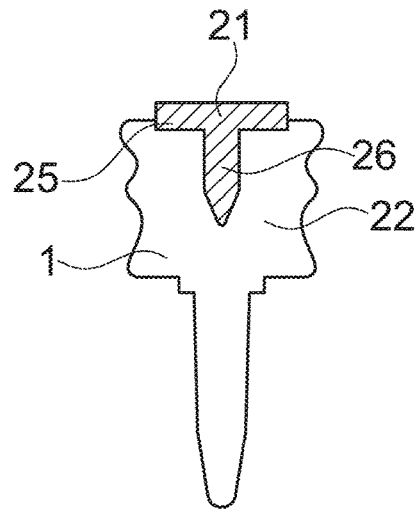
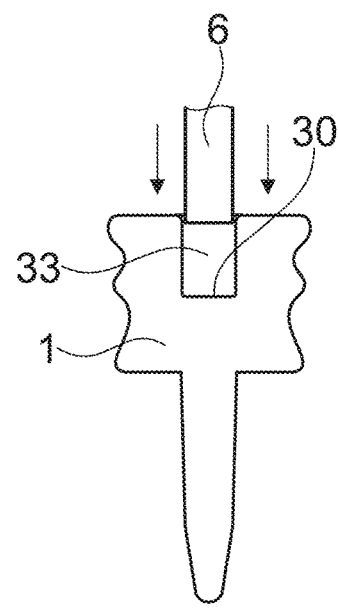
Fig. 7    Fig. 8
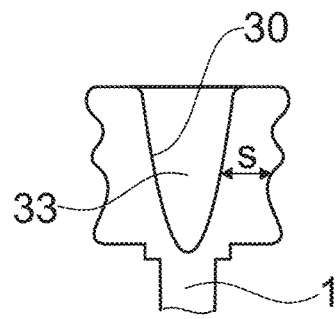
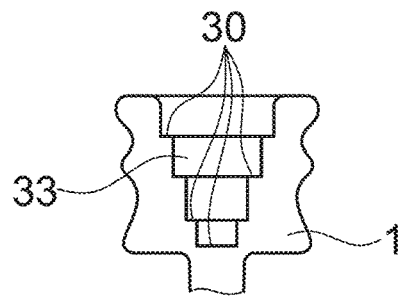
Fig. 9    Fig. 10
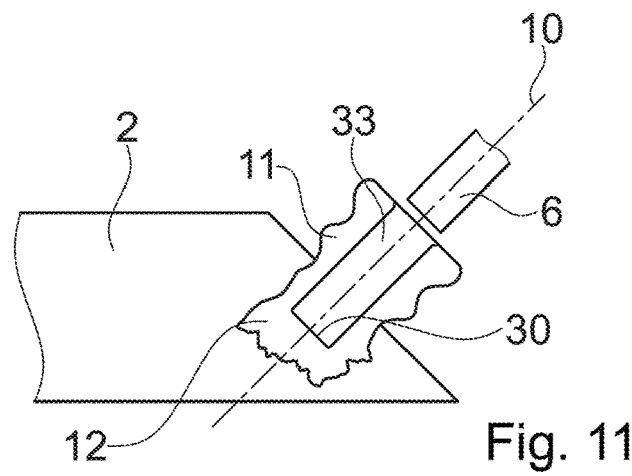
Fig. 11

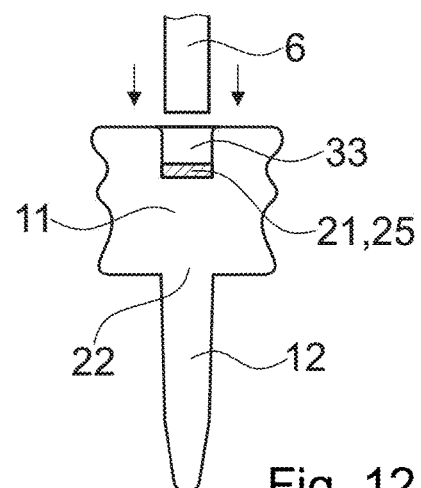
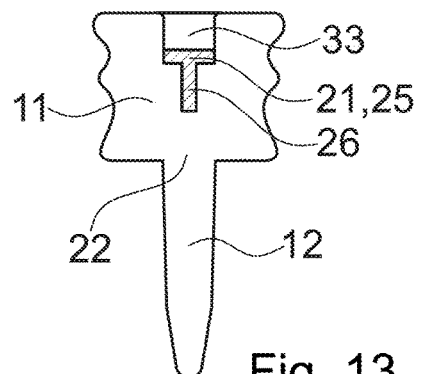
Fig. 12 Fig. 13
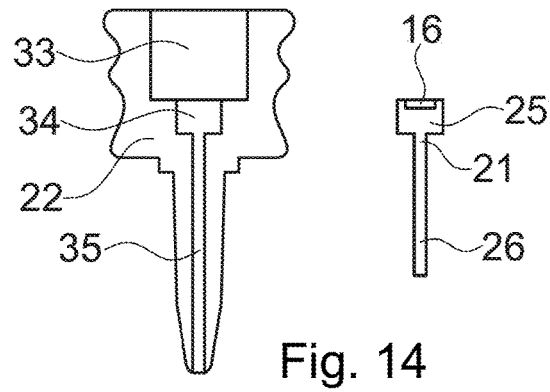
Fig. 14
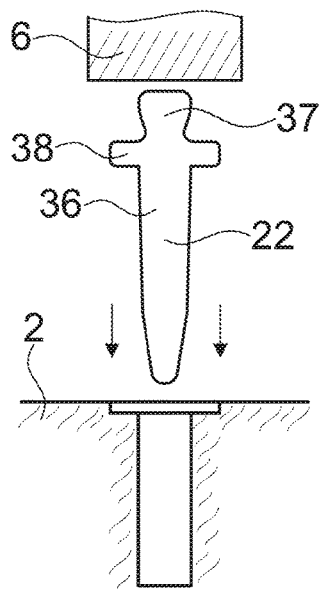
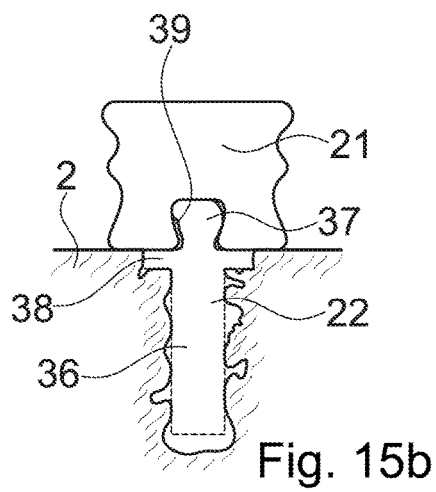
Fig. 15a Fig. 15b

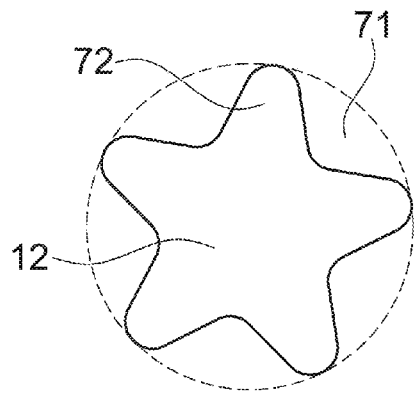
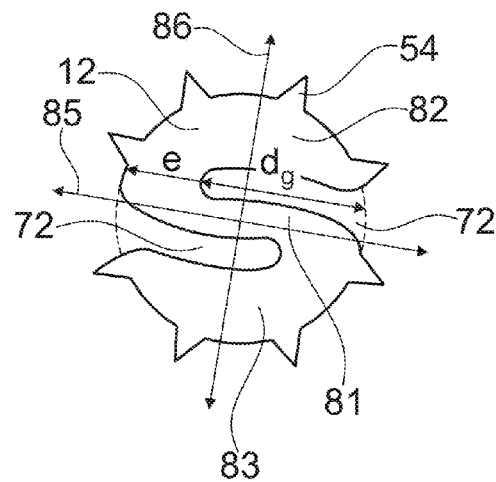
Fig. 27    Fig. 28
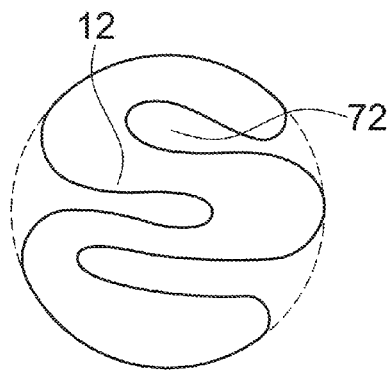
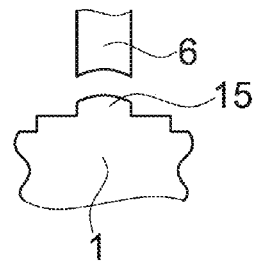
Fig. 29    Fig. 30
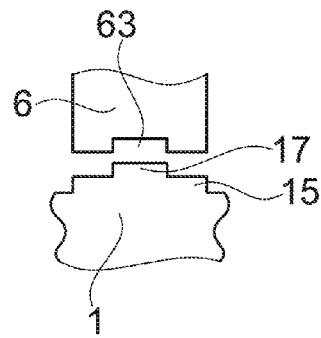
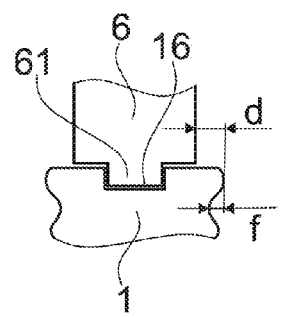
Fig. 31    Fig. 32

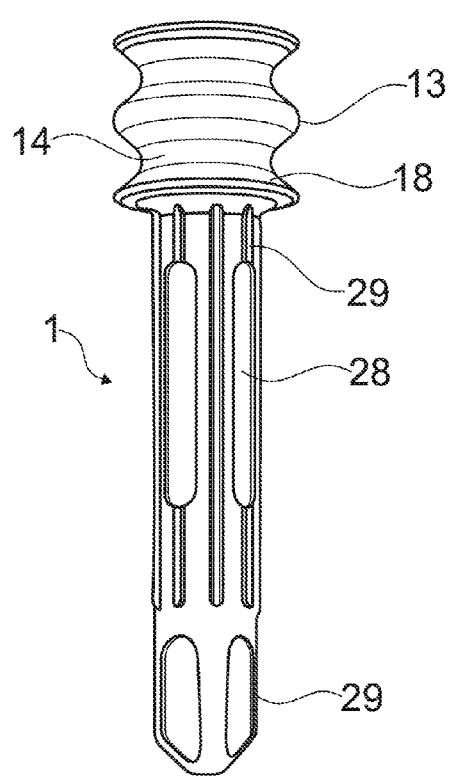
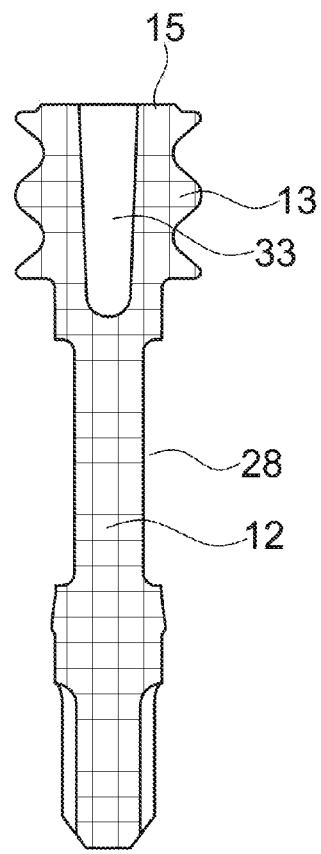
Fig. 35a      Fig. 35b
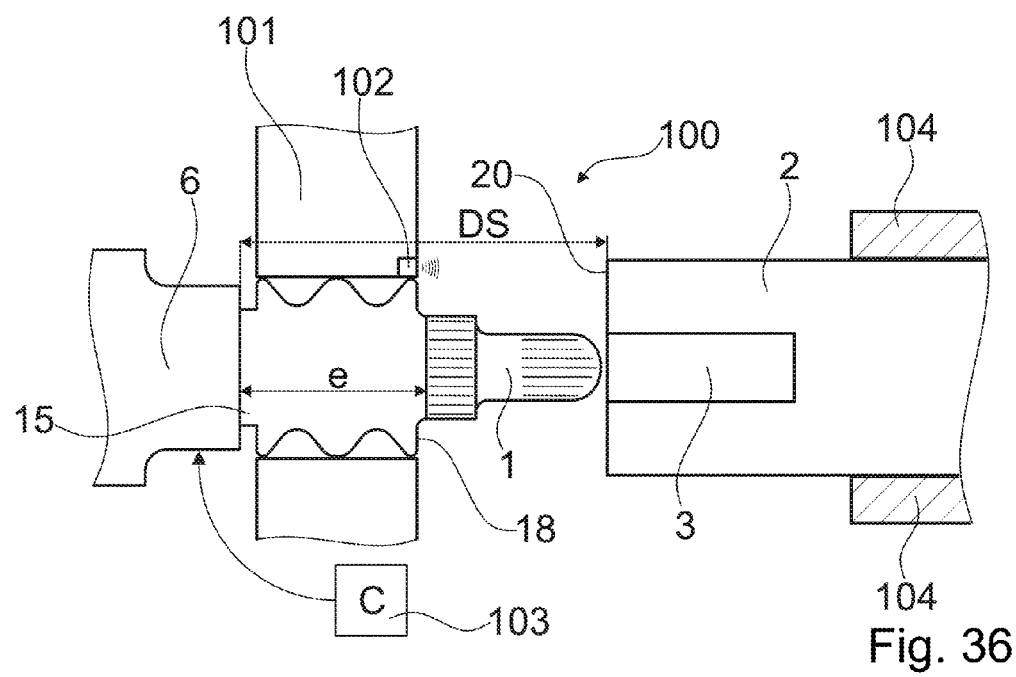
Fig. 36

ANCHORING A JOINING ELEMENT IN AN OBJECT

BACKGROUND OF THE INVENTION

Field of the Invention

The invention is in the field of mechanical engineering and construction and especially furniture construction. In particular, it relates to a method of anchoring a joining element in an object and to an according joining element, as well as to an assembly including such a joining element.

Description of Related Art

Joints between different parts are an important issue in mechanical construction, for example in the furniture industry. Many of such joints comprise, on at least one of the parts to be joined, a joining element with an in-depth anchored portion ("anchoring portion" in the following text) and a protruding portion, often referred to as "head". The in-depth anchored portion may for example be screwed into the part, and the head may include means for making the connection to the further part possible. To this end, the further part may include a second joining element cooperating with the joining element of the first part.

WO 2013/104422 by Inter Ikea Systems B.V. discloses a joint in which a first furniture part to be joined has one or more male parts co-operating with one or more female parts of the second furniture part. The male part in this may be a joining element with a peg-like in-depth anchored portion and a head portion. The peg-like in-depth portion is glued into the first furniture part.

The joint disclosed in WO 2013/104422 relies on the head portion of the male part and the female part each having a number of grooves, wherein the male and female parts are moved with respect to each other during assembly, and wherein the grooves of at least one of the male part and the female part are inclined so that the furniture parts are pressed toward each other when the male part is moved relative to the female part.

In this, and also in other joints including a joining element with a protruding ("male") portion, the shape of the protruding part has a critical function. In the system of WO 2013/104422, if the grooves of the male and female parts do not match each other with sufficient accuracy, it will be either hard or impossible to introduce the male part properly, or the effect of pressing the furniture parts toward each other is not achieved and, consequently, sufficient stability is not achieved.

A further important issue in connection to joints for furniture or other objects is manufacturing cost, both for the manufacturing of the joining elements and for the act of providing the parts with the joining elements. While joining elements of metal, for example with a threaded anchored portion, can be designed so that the shape of the head portion sufficiently satisfies the requirements for their stability, their manufacturing is comparably expensive. Also, if the anchoring in the respective parts is done in the factory (as opposed to self-assembly by the customer), it is comparably time-consuming and thus expensive.

For this reason, it has been proposed in WO 2013/104422 to manufacture the joining element of plastics by injection molding, and the anchoring of the anchoring portion is done by gluing into a pre-manufactured opening of the furniture part. However, this kind of anchoring features the disadvantage that the glue volume has to be adapted to the porosity of the chipboard. If too little is injected, the interface lacks sufficient glue because the glue will be soaked into the wood, and if too much is injected, a liquid cushion will arise that may prevent exact depth positioning of the joining element. Also, gluing entails cleaning efforts, and the step of gluing is comparably time consuming in that the glue has to harden for some time. Also, it is in the nature of gluing connection that the glue sticks to the surface of the respective parts only. Even if the glue is very strong, the glue connection will provide a limited anchoring stability if one of the parts itself has a material of limited stability, for example if the part is of a comparably brittle chipboard.

From WO 98/042988 (Woodwelding) it is known to anchor joining elements including materials having thermoplastic properties in fibrous or porous materials such as e.g. chipboard or wood. For such anchoring, a fore (distal) portion is positioned for in-depth anchoring in an opening, and then mechanical vibration, in particular ultrasonic vibration, and a force directed for pressing the joining element into the opening are simultaneously applied to the a rearmost (proximal) coupling-in face of the joining element. In the step of applying vibration and force, the material having thermoplastic properties is liquefied due to friction heat at least where in contact with the fibrous or porous material and it penetrates into the fibrous or porous material of the walls of the opening and forms on re-solidification a positive fit connection with the porous or fibrous material.

In the unpublished International patent application PCT/EP2015/061853, a method of joining two objects is disclosed, wherein an insert portion one of the objects, including thermoplastic material, is inserted in an opening of the other one of the objects in a manner that an interference fit results, whereafter energy suitable for liquefaction of the first material, especially mechanical vibration energy, is coupled into the objects in an amount and for a time sufficient, for liquefaction of the thermoplastic material and interpenetration of the materials at an interface where the objects are pressed against each other due to the interference fit.

While both these methods result in an improved in-depth anchoring of the joining element compared to glue connections and can be applied with a rather high precision of placement and relatively quickly, they entail energy input and considerable force on the rear (proximal) end of the joining element, which in combination may lead to deformations of the protruding (head) portion. They thus are not as such suitable for anchoring joining elements of liquefiable material the head portion of which must have a pre-defined shape and position.

SUMMARY OF THE INVENTION

It is an object of the present invention to provide methods of anchoring a joining element in an object of a material capable of being penetrated by a thermoplastic material in a liquid state, especially of a porous material and/or material in which pores can be generated by applying hydrostatic pressure, such as wood composite materials or wood or solid foams, which methods are suitable for joining elements of the above-discussed kind in which a head portion (protruding portion) has to cooperate with a female structure of an other object to press the object toward the other object.

In the method according to a first aspect of the invention, a joining element is provided, which joining element has an anchoring portion for in-depth anchoring in the object and a head portion (protruding portion) arranged proximally of the anchoring portion with respect to an insertion axis. The head portion has a lateral outer surface that has a structure that is well-defined, especially within tight tolerances. For example, the lateral outer surface may be structured to cooperate with corresponding structure of a further object in a manner that an axial pulling force on the joining element can be transmitted through the structure—thus, the structure includes an undercut with respect to axial directions. For example, the lateral outer surface may include at least one groove and/or at least one ridge, and for example may be undulated with at least one groove arranged alternating with ridges. Especially, the outer surface may be well-defined within tight tolerances of for example less than 1 mm, especially less than 0.6 mm or even less than 0.2 mm.

The joining element includes a thermoplastic material (i.e. a material having thermoplastic properties) at least on a surface of the anchoring portion. In embodiments, it may consist of the thermoplastic material. The method includes the further steps of positioning the joining element relative to the object of in a manner that the anchoring portion reaches into an opening of the object or is placed adjacent a mouth thereof, pressing the joining element towards a distal direction, to press the anchoring portion (further) into the opening, and at the same time coupling mechanical vibration energy into the joining element by a tool in an amount and for a time sufficient for liquefaction of a portion of the thermoplastic material to cause interpenetration of the thermoplastic material into structures of the object, wherein the method includes leaving the lateral outer surface of the head portion intact, thus unaffected by the pressing and the vibration.

After the step of pressing and coupling energy into the joining element, the energy input is stopped and the thermoplastic material is caused to re-solidify, so that a solid positive-fit connection results. The tool may be removed.

In this text, a "distal" direction is generally a direction into which the pressing force is applied. The "proximal" direction is the opposite direction. Often, for the person carrying out the method, "distal" directions are "forward" directions and "proximal" directions are "rearward" directions. In contrast to "rearward" and "forward", "proximal" and "distal" not only refer to directions but also refer to (relative) locations.

The step of pressing and coupling energy into the joining element may cause the joining element to be moved towards a distal direction, as for example taught in WO 98/042988. This, however, need not be the case. In accordance with the teaching of PCT/EP2015/061853, it is also possible that due to an interference fit and/or other forces the joining element essentially stands still. In these embodiments, the pressing force will primarily serve for a mechanical coupling between the (vibrating) tool and the joining element.

Depending on how the joining element is applied, different basic configurations are possible. For many configurations of a first kind, the insertion axis, which may optionally be an axis of symmetry of the anchoring portion, coincides with an axis of the head portion, along which the above-mentioned axial pulling force is applied, to form a common joining element axis, or is parallel to it. In this basic configuration, the coupling face will be essentially perpendicular to the joining element axis, and the surface of the object in which the joining element is anchored will be essentially perpendicular to the axis and thus essentially parallel with the coupling face.

In many situations, the joining element will be anchored in an object with a well-defined plane surface, such as a board having plane large side and narrow surfaces. Generally, or particularly in cases in which the head portion is not by itself symmetrical about an axis, the head portion axis may be defined to be the axis through a center of the head in a direction perpendicular to the plane surface in which the opening is present and from which the head portion protrudes.

The "lateral outer surface" of the head portion in this text may be a surface that is a lateral surface with respect to a head portion axis, with respect to which axis there is an undercut. Such an axis may for example be a symmetry axis of the head portion.

The mechanical vibration in many embodiments is applied to a proximally facing coupling-in face of the joining element and is transmitted to a more distal zone of the joining element, including for example its distal end. It has been found that for this purpose, for characteristic dimensions of joining elements in furniture and construction industry (with a connector length of for example between 1 cm and 20 cm), vibrations with frequencies between 5 kHz or 10 kHz and 100 kHz, especially around 15-50 kHz, and in particular between 18 kHz and 30 kHz are suited, with higher frequencies being suitable for a local liquefaction at the interface (as known from ultrasonic welding). In order for the vibrations to be transmitted to the more distal zone, common oscillating system of the tool (sonotrode) and the joining element can be created. To do, so, a comparably strong pressure of for example $10^5$ N/m$^2$ or more has to be applied to the interface between the tool and the joining element; for smaller pressing forces, the coupling between tool and joining element becomes weak, and the tool subject to the oscillations will hammer on the coupling face rather than coupling the vibrations into the joining element, leading to primary energy absorption at the interface.

For a common oscillating system with coupling with sufficient pressing force and frequencies for example around 10-50 kHz, the zone within a few millimeters from the coupling face is in the near field. This zone of 1-2 mm from the coupling face is hereinafter also called 'interface zone'.

It has been found that even for comparably high pressing forces, leading to a comparably good coupling between the tool and the joining element, some energy will under real-life conditions inevitably be absorbed in the interface zone. This will lead to a warming of the material in the interface zone, and, due to the necessarily high pressure (for lower pressing forces, the coupling becomes weaker, and the energy losses in the interface zone thus become higher, leading to more warming), a plastic deformation by which the material evades into lateral-radial direction. This is illustrated in FIGS. 1a and 1b showing a comparative configuration (not according to the present invention) with a joining element 201 consisting of a thermoplastic material anchored in an object 202 for example of chipboard. FIG. 1a shows the initial state in which the joining element is positioned in an opening 203 of the object, and a sonotrode 206 acts to press the joining element towards a distal direction while being subject to vibrations. The small arrows in the interface zone in FIG. 1a illustrate the pressure coupled into the joining element. FIG. 1b shows the arrangement at the end of the anchoring process in accordance with WO 98/042988. Liquefaction is predominant at the places of high external friction, i.e. in the illustrated configuration near the distal end where the thermoplastic material interpenetrates the object and leads to a desired anchoring in an anchoring zone 208. However, due to the softening in the interface zone and the pressure, thermoplastic material will be slightly deformed also in the interface zone even if there is no liquefaction in this zone. This will cause some uncontrolled evading of material to the lateral sides as illustrated by the small circles 209 in FIG. 1*b*. This in turn results in an uncertainty concerning the final dimensions, as the height reduction Δx as well as the expansion of the radial dimension ΔR cannot be precisely predicted.

Thus, in approaches according to the prior art, the lateral outer surface will not be left intact and thus will not be well-defined any more. For this reason, methods of anchoring an object which methods include applying mechanical vibration to a proximally facing contact face to liquefy thermoplastic material were so far considered not suitable for anchoring a joining element of the herein discussed kind. In contrast thereto, the aspect of the invention does use mechanical vibrations that liquefy thermoplastic material for an in-depth anchoring of the anchoring portion while leaving a lateral outer portion of the head portion intact.

For carrying out the invention according to its first aspect, different concepts are feasible for pressing the joining element towards a distal direction (generally against the object) and coupling mechanical vibration into the joining element.

According to a first concept, the pressure and the mechanical vibration are applied by the tool, by pressing the tool against a proximal end face of the head portion. If the head portion can be viewed as a 'head', then the first concept features pressing the joining element on the head and coupling the mechanical vibration into the head. In embodiments of this first concept, the head portion is equipped for preventing any deformation of the functional portion of the structured lateral outer surface.

According to a second concept, the head portion includes a recess open to the proximal side. The pressure and mechanical vibration are applied by the tool to a coupling face within the recess. Such a coupling face can include an end face of the recess, at the bottom of the recess. In addition or as an alternative, the coupling face may include a shoulder within the recess. In addition or according to yet another alternative, the coupling face may include a slanted or curved surface portion not parallel to the insertion axis.

According to the second concept, the pressure and vibrations are thus applied inside the head portion ('inside the head') or even inside the anchoring portion—the coupling face into which the pressure and vibrations are coupled is offset with respect to the proximal end face of the head portion.

In embodiments realizing the second concept, an outer shape of the tool may be adapted to a shape of the recess so that the tool is automatically aligned with the joining element, and guides and/or carries it during the process.

The recess will generally have a substantial depth. Especially, an aspect ratio of the recess may be at least 0.5 or at least 1.

This second concept and also the first and third concepts are based on the insight that firstly the mechanical vibrations coupled via a coupling face against which a vibrating tool is pressed are longitudinal vibrations and will tend to propagate in the joining element in a forward direction, thus further distally, Secondly, the dissipation or external friction that causes the generation of heat that will ultimately lead to deformation, and liquefaction is predominant at places where the element is under mechanical stress. The second concept may lead to the lateral outer surface being a stress-reduced zone.

In this, the shape and size of the recess may be adapted to the geometry of the head portion in a manner that the force distribution is optimized for this purpose. Especially, the aspect ratio (ratio between depth and width of the recess) may be sufficiently high, for example at least 0.5, or at least 1 or even at least 1.5.

In accordance with a third concept, the pressure and mechanical vibrations are not applied to the head portion but to a base surface of the anchoring portion—thus besides the head, for example around the head. In other words, not the proximal-most portion of the joining element is subject to the pressure and the mechanical vibrations, but the joining element is provided with a proximally-facing coupling face besides the head portion, and the tool (sonotrode) is accordingly adapted.

This coupling face may especially have an axial position corresponding to the plane between the head portion and the anchoring portion. Thus, the step of pressing the joining element towards a distal direction and at the same time coupling mechanical vibration energy into the joining element by a tool may include pressing until the coupling face is flush with a surface of the object or is below this surface, while the head portion protrudes above this surface.

Also the third concept will lead to the functional portion of the lateral outer surface of the head portion to be a stress-reduced zone. In fact, in embodiments of the third concept, the entire head portion may be stress-reduced.

In accordance with a fourth concept, which may be combined with any one of the first, second, or third concepts, a mould tool is used for preserving the lateral outer shape of the head portion during at least a portion of the time of coupling mechanical vibration energy into the head. To this end, such a mould having a surface portion with a shape corresponding to a negative of the shape of the lateral outer surface is brought into contact with the lateral outer surface of the head and is, for example, kept there until the pressing force that presses the joining element towards the distal direction stops.

In accordance with a first group of embodiments, which implements the first concept, the head portion is provided including a proximal-most zone of controlled deformation.

In this first group of embodiments, the proximal end face of the joining element will be perpendicular to the insertion axis, which axis is then often also the axis of the head portion or at least parallel to it. If the object in which the joining element is anchored has a plane surface, the proximal end face will often be essentially parallel to the surface in which the opening is provided.

In the first group of embodiments, the method therefore includes:
  providing the joining element, especially of the above-discussed kind, with an anchoring portion for in-depth anchoring in the object and a head portion arranged proximally of the anchoring portion with respect to an insertion axis, wherein the head portion has a lateral outer surface, for example a lateral outer surface having an undercut or other structure making it suitable for a key-hole functionality together with a different part, wherein the joining element includes a thermoplastic material at least on a surface of the anchoring portion,
  arranging the joining element relative to the object in a manner that the anchoring portion reaches into an opening of the object or is placed adjacent a mouth thereof,
  pressing the joining element towards a distal direction and at the same time coupling mechanical vibration energy into the joining element by a tool in an amount and for a time sufficient for liquefaction of a portion of the thermoplastic material to cause interpenetration of the thermoplastic material into structures of the object,
  wherein in the step of pressing, a coupling-out face of the tool is pressed against a proximal end face of the joining element, a tool-joining-element-interface being formed between the coupling-out face and the proximal end face, wherein the interface has a smaller radial extension than a radial extension of the head portion.

Thus, in embodiments of the first group, the zone of controlled deformation is provided by the tool-joining-element-interface having a radial extension smaller than the radial extension of the head portion, i.e. the interface does not reach as far as the functional part of the lateral outer surface. This may be achieved by the tool having a smaller radial extension than the head portion, or by a proximal protrusion of the joining element as discussed hereinafter, or both.

In a first sub-group of embodiments of the first group, the zone of controlled deformation is provided as a proximal protrusion, a radial extension of which is smaller than the radial extension of the head portion, i.e. the deformation zone does radially not reach as far as the functional portion of the lateral outer surface.

In a second sub-group of embodiments of the first group, the coupling-out face of the tool has a radial extension that is smaller than the radial extension of the head portion.

Many embodiments belong to both, the first and the second sub-group.

Especially in embodiments of the second sub-group, the coupling-out face of the tool may be non-plane and make controlled deformation possible in a mold-like manner.

In case the head portion is symmetrical about the insertion axis (the head portion has essentially the shape of a solid of revolution), the zone of controlled deformation may for example be ring-shaped or disc-shaped. An axial extension t of this zone may be between 0.1 mm and 2 mm, especially between 0.2 mm and 1 mm.

In accordance with a second group of embodiments, the joining element includes a liquefiable part and a non-liquefiable part.

In many embodiments of the second group of embodiments, the method includes providing the joining element with a proximally facing coupling surface of the non-liquefiable material, wherein for the step of coupling mechanical vibration energy into the joining element, the tool is pressed against the coupling surface while it is subject to vibrations.

In these embodiments of the second group of embodiments, therefore the method of anchoring a joining element in an object includes:
providing the joining element, especially of the above-discussed kind, with an anchoring portion for in-depth anchoring in the object and a head portion arranged proximally of the anchoring portion with respect to an insertion axis, wherein the head portion has a lateral outer surface with an undercut, wherein the joining element includes a thermoplastic material at least on a surface of the anchoring portion,
arranging the joining element relative to the object in a manner that the anchoring portion reaches into an opening of the object or is placed adjacent a mouth thereof,
pressing the joining element towards a distal direction and at the same time coupling mechanical vibration energy into the joining element by a tool in an amount and for a time sufficient for liquefaction of a portion of the thermoplastic material to cause interpenetration of the thermoplastic material into structures of the object,
wherein in the step of providing, the joining element is provided with a proximally facing coupling surface of a non-liquefiable material, wherein for the step of coupling mechanical vibration energy into the joining element, the tool is pressed against the coupling surface while it is subject to vibrations.

The second group of embodiments includes embodiments implementing the first concept, embodiments implementing the second concept, and also some embodiments implementing the third concept.

In this text, generally a "non-liquefiable" material is a material that does not liquefy at temperatures reached during the process, thus especially at temperatures at which the thermoplastic material is liquefied. This does not exclude the possibility that the material would be capable of liquefying at temperatures that are not reached during the process, generally far (for example, by at least 80° C.) above a liquefaction temperature (melting temperature for crystalline polymers for amorphous thermoplastics a temperature above the glass transition temperature at which the becomes sufficiently flowable, sometimes referred to as the 'flow temperature' (sometimes defined as the lowest temperature at which extrusion is possible), for example the temperature at which the viscosity drops to below $10^4$ Pa*s (in embodiments, especially with polymers substantially without fiber reinforcement, to below $10^3$ Pa*s)), of the thermoplastic material. For example, the non-liquefiable material may be a metal, such as aluminum or steel, or wood, or a hard plastic, for example a reinforced or not reinforced thermosetting polymer or a reinforced or not reinforced thermoplastic with a melting temperature (and/or glass transition temperature) considerably higher than the melting temperature/glass transition temperature of the liquefiable part, for example with a melting temperature and/or glass transition temperature higher by at least 50° C. or 80° C.

In a first sub-group of embodiments of this second group of embodiments, at least a part of the head portion—especially at least a part including the structured lateral outer surface—is made of the non-liquefiable material. The joining element then includes this non-liquefiable part and further includes a liquefiable part, which liquefiable part includes at least an outer surface of the anchoring portion.

In a second sub-group of this second group of embodiments, the structured lateral outer surface of the head portion is made of the liquefiable (thermoplastic) material, and a part that includes the non-liquefiable material is an insert element integrated in the liquefiable part.

In embodiments especially of the second sub-group of embodiments (as well as in embodiments of other sub-groups or groups described herein), the coupling face may be offset with respect to a proximal end face of the joining element. Especially, the head portion may include, in accordance with the second concept mentioned hereinbefore, a recess in the proximal end face, and the coupling face may be arranged in this recess, especially at the bottom of this recess. In specific embodiments, an aspect ratio of such recess may be at least 0.5 or even at least 1.

In embodiments of the second sub-group of embodiments, the non-liquefiable part (the integrated element) may include a coupling plate. Such a coupling plate may for example—implementing the second concept—be arranged at the bottom of a recess accessible from the proximal side, in which recess the tool engages.

Alternatively, according to the first concept, such a coupling plate may be provided as a proximal-most plate. In this, the plate may have a radial (lateral) extension that is smaller than the radial extension of the whole head portion.

In further embodiments of the second sub-group of embodiments, the non-liquefiable part may include a pin portion extending distally from the coupling face. For example, the pin portion may extend distally into the anchoring portion from the coupling face that is in the head portion. Such an integrated non-liquefiable element with a pin portion may give additional strength, also against shearing forces.

The cavity in the liquefiable part, into which such a pin portion extends, may be a through hole extending to the distal end. These embodiments feature the advantage that injection molding of the liquefiable part is facilitated by the through hole, so that void (such as air bubble) formation can more easily be prevented.

In embodiments of the second group of embodiments, the liquefiable part and the non-liquefiable part may be coupled together by at least one of:
- a press fit;
- an adhesive bond;
- interpenetration of structures of the non-liquefiable part by material of the liquefiable part so that a positive-fit connection results.

In accordance with a first option, the liquefiable and non-liquefiable parts may constitute an integral, pre-manufactured joining element. For example, the parts may be injection molded together, i.e. the liquefiable part may be injection molded in presence and onto the non-liquefiable part (insert molded/overmolded). Also, pre-assembly by a manufacturing step separate form an injection molding step is possible, for example a gluing step.

In accordance with a second option, the joining together may be achieved during the process itself and as part of the method. Then, the liquefiable part and the non-liquefiable part of the joining element are provided as separate parts.

In embodiments entailing a positive-fit connection between the liquefiable and non-liquefiable parts, the non-liquefiable part then includes a surface structure with an undercut (by at least one indentation or the like) that is suitable to form a positive-fit connection with the liquefiable material. During the step of pressing the joining element towards a distal direction and at the same time coupling mechanical vibration energy into the joining element, the liquefiable and non-liquefiable parts are pressed against each other while the mechanical vibration energy is coupled into the non-liquefiable part and/or the liquefiable part until material of the liquefiable part liquefies where in contact with the non-liquefiable part, penetrates into the structure and thereby, after re-solidification, makes a positive-fit connection with the non-liquefiable part.

In addition or as an alternative, the liquefiable and non-liquefiable parts may be joined by a press fit connection, possibly combined with an adhesive bond, by the step of pressing and coupling vibration energy into the joining element.

More generally, in accordance with some embodiments of the second group, the method includes the step of assembling the liquefiable part and the non-liquefiable part together from initially separate parts, especially by the effect of the mechanical energy or additional mechanical energy or possibly heat applied in a separate method step. Also assembling by clipping the parts together or the like is possible.

Further, it is possible to anchor the liquefiable part in a first sub-step by the vibration and pressing, and to assemble the non-liquefiable part with the liquefiable part thereafter in a separate sub-step.

In a third group of embodiments, the second concept is implemented with the coupling face being of the thermoplastic material.

Especially, in embodiments of the second concept, the joining element may be one-piece and consist of the thermoplastic material.

In embodiments of the third group of embodiments, a sonotrode having a coupling face including a first coupling face portion within the recess and a second coupling face portion around a rim of the recess, pressing against a proximal end face of the joining element, may be used. In this, it may be preferable if the second coupling face portion does not extend radially as far as the lateral extension of the head portion, in accordance with the first concept.

In implementations of the second concept, the method includes:
providing the joining element, especially of the above-discussed kind, with an anchoring portion for in-depth anchoring in the object and a head portion arranged proximally of the anchoring portion with respect to an insertion axis, wherein the head portion has a lateral outer surface with an undercut, wherein the joining element includes a thermoplastic material at least on a surface of the anchoring portion, and wherein the head portion includes a recess open to the proximal side,
arranging the joining element relative to the object in a manner that the anchoring portion reaches into an opening of the object or is placed adjacent a mouth thereof, and positioning a tool relative to the joining element in a manner that the tool reaches into the recess,
pressing a coupling-out face of the tool against a coupling face of the joining element, the coupling face of the joining element being constituted by a surface of the recess, thereby pressing the joining element towards a distal direction, and at the same time coupling mechanical vibration energy into the joining element by the tool in an amount and for a time sufficient for liquefaction of a portion of the thermoplastic material to cause interpenetration of the thermoplastic material into structures of the object.

In embodiments of the third group of embodiments, the thermoplastic material is arranged in addition to the surface of the anchoring portion also at least at the coupling face.

In a fourth group of embodiments, the third concept is implemented. To this end, the joining element includes a proximally facing base surface of the anchoring portion, which surface serves as the coupling face. This may imply that the joining element forms a kind of shoulder between the head portion and the anchoring portion.

In the fourth group of embodiments, the method therefore includes:
providing the joining element, especially of the above-discussed kind, with an anchoring portion for in-depth anchoring in the object and a head portion, wherein the anchoring portion includes a proximally facing coupling face, wherein the head portion has a lateral outer surface with an undercut, wherein the joining element includes a thermoplastic material at least on a surface of the anchoring portion,
arranging the joining element relative to the object in a manner that the anchoring portion reaches into an opening of the object or is placed adjacent a mouth thereof, and positioning a tool relative to the joining element,
pressing a coupling-out face of the tool against the coupling face, thereby pressing the joining element towards a distal direction, and at the same time coupling mechanical vibration energy into the joining element by a tool in an amount and for a time sufficient for liquefaction of a portion of the thermoplastic material to cause interpenetration of the thermoplastic material into structures of the object.

The head portion may extend proximally from the anchoring portion and hence proximally from the coupling face.

Especially, the step of pressing and coupling energy may be carried out until the coupling face is flush a surface of the object or is below the surface, with the head portion protruding from the object.

In an example, the joining element may include an anchoring portion body distally of the head portion, which body forms the shoulder and thus includes the coupling face. Distally of the body, the anchoring portion may include a protrusion or a plurality of protrusions that during the anchoring process either protrude(s) in at least one pre-made according opening of the object or is/are pressed into the object through the surface thereof.

In embodiments of the fourth group of embodiments, the at least one protrusion may be arranged essentially at lateral positions of the coupling face, i.e. spaced only axially from the coupling face and not, for example, underneath the center of the head portion. This makes possible that mechanical vibrations are coupled into the protrusions by direct axial sound transfer, and this makes the joining element design particularly simple.

For many applications, it is not desired if other parts of the joining element than its head portion protrude above the surface of the object to which it is secured. Therefore, the method may include providing the object with an opening the lateral dimensions of which are adapted to the lateral dimensions of the anchoring element body, and the depth of which corresponds to the height of the body or is slightly below this height or is greater than this height, and the step of pressing and coupling vibrations into the tool is carried out until the coupling face is flush with the surface of the object or is below this surface, for example due to a pre-made counterbore.

The tool used for coupling the pressing force and vibrations into the joining element is adapted to its shape. Especially, it may include a distally facing coupling-out face the shape of which approximately corresponds to the shape of the coupling face, with the space being left for the head portion protruding proximally above the anchoring portion body. For example, the sonotrode may be essentially dome-shaped with a ring-shaped coupling face and a hollow space left for the head portion.

Embodiments of the fourth group of embodiments may also belong to the second group of embodiments, i.e. include a part of a non-liquefiable material. Especially, the anchoring portion body may be fortified by a plate or similar, and/or the head portion may include, for example even consist of, a non-liquefiable material for adding mechanical strength.

In a fifth group of embodiments, the fourth concept is realized. To this end, a mould tool, which for example may include two shells approaching the head portion from opposite lateral sides, is placed relative to the head portion for at least some of the time during which the pressing force acts on the joining element. For example, the mould tool may be applied during the full interval during which the mechanical vibrations and the pressing force act.

In the fifth group of embodiments, the method therefore includes:
providing the joining element, especially of the above-discussed kind, with an anchoring portion for in-depth anchoring in the object and a head portion arranged proximally of the anchoring portion with respect to an insertion axis, wherein the head portion has a lateral outer surface, for example with an undercut, wherein the joining element includes a thermoplastic material at least on a surface of the anchoring portion,
arranging the joining element relative to the object in a manner that the anchoring portion reaches into an opening of the object or is placed adjacent a mouth thereof,
pressing the joining element towards a distal direction and at the same time coupling mechanical vibration energy into the joining element by a tool in an amount and for a time sufficient for liquefaction of a portion of the thermoplastic material to cause interpenetration of the thermoplastic material into structures of the object,
wherein in the step of pressing, at least for a portion of the time a mould tool having a shape corresponding to a negative of at least a portion of the lateral outer surface of the head is held against the lateral outer surface of the head.

In this, especially the sonotrode still acts only on the joining element and has no vibrating contact with the proximal face of the mould tool during the insertion process.

The approach according to the fifth group of embodiments may be used on its own or as additional measure for any embodiment of the first, second, third and/or fourth group of embodiments in which the lateral outer surface is of a thermoplastic material.

The invention according to its first aspect (and also according to its second aspect described hereinafter) also concerns joining elements of the herein defined and described kind with the features described referring to the respective embodiments of the methods according to aspects and concepts of the invention. The invention further concerns an assembly of a joining element and a tool (sonotrode) of the kind described and claimed herein.

A joining element according to the first aspect of the invention for being anchored, with the aid of a thermoplastic material and mechanical vibration, in an object may therefore include:
an anchoring portion for in-depth anchoring in the object, and an a head portion proximally of the anchoring portion, the joining element including a thermoplastic material at least on a surface of the anchoring portion, wherein at least one of the following conditions is met:
The head portion includes a proximal protrusion a radial extension of which is smaller than the radial extension of the head portion (condition A);
The head portion includes a recess open to the proximal side, the recess having a width sufficient for a tool to engage the joining element within the recess to couple mechanical vibration into the joining element, so that that portions of the thermoplastic material near the surface of the anchoring portions liquefy while a lateral outermost surface portion of the head portion remains intact (condition B);
The joining element includes a liquefiable part and a non-liquefiable part and the non-liquefiable part forms a proximally facing coupling-in face for coupling the mechanical vibration into the joining element by a tool (condition C);
The anchoring portion includes an anchoring portion body and a plurality of protrusion facing distally away from the anchoring portion body, wherein the anchoring portion body forms a proximally-facing coupling face in a vicinity of the head portion (condition D).

Condition B may for example be tested by placing the connecting element in a fitting bore of an object of plywood and by using a sonotrode that fits into the recess, the sonotrode being subject to mechanical vibrations of a frequency of 20 kHz being pressed by a pressing force corresponding to $5*10^5$ N/m$^2$ with an amplitude of about 40 μm. If this leads to no liquefaction or liquefaction only locally around the sonotrode even if applied for a longer time (of for example up to 20 s), then the size of the recess is not sufficient to meet condition B, or the length of the dowel is not appropriate to vibrate in resonance. If however, liquefaction starts at the anchoring-portion-plywood-interface, then the condition is met.

A further, second aspect of the invention, that may be applied to any embodiment of the first aspect injection or to any other joining element suitable of being anchored by mechanical vibration relates to the cross section in transversal section (thus in section perpendicular to an insertion axis). An often economical method of manufacturing joining elements including thermoplastic material is injection molding. In injection molding, especially of bulky parts, void formation may be a problem.

It is an insight underlying this aspect of the invention that voids tend to be prevented if the cross section of the injection molded parts is homogeneous, not only as a function of the axial position but also in a cross section. Especially, it may be advantageous for the injection molding process, if the differences between distances of innermost portions from a mold wall are comparably homogeneous.

In many embodiments, the joining element has a generally elongate shape with the head portion and an elongate, pin-like anchoring portion forming a shaft.

For example for such embodiments, according to a second aspect of the invention, a joining element for being anchored in an object of penetrable material is provided, the joining element including shaft serving as an anchoring portion for in-depth anchoring in the object, and an a head portion proximally of the anchoring portion, with a distally facing shoulder or a border line between the head portion and the anchoring portion, the joining element including a thermoplastic material at least on a surface of the anchoring portion, wherein at least one of the following conditions is fulfilled:
the head portion includes a recess open to a proximal end, the recess extending axially substantially through the entire head portion (first condition), especially through the entire head portion and possibly further, beyond the head portion and into the shaft portion;
the anchoring portion includes at least one groove running in axial direction, the groove having a depth of at least 15% of an average shaft diameter (second condition).

In this "running in axial direction" does not imply that the at least one groove is strictly parallel to the axis of the shaft. Rather, for example also slightly helical shapes are possible; often the angle should not exceed about 30° to the axis.

The first condition implies that an average lateral extension of the recess is substantial compared to a lateral extension of the head portion; for example it may have a diameter of at least 40% or at least 50% of the head diameter. An axial extension (depth) of the recess amounts to at least about 80% of the axial extension of the head portion, often to 100% or more.

In the second condition, the groove is, due to its depth, substantially different from grooves that arise between energy directing ribs of state-of-the art joining elements. Surface parts other than the groove (between the grooves if a plurality of groves is present) have a generally smoothly convex shape, with possible energy directing elements formed in addition. Such surface parts other than the groove may have a substantial circumferential extension.

The groove may run essentially long an entire axial length of the anchoring portion.

In a group of embodiments of the second aspect, the lateral surface of the shaft is generally undulated with possible energy directing elements on the peaks of the undulation.

In a further group of embodiments, the anchoring portion includes a plurality of grooves on opposite lateral sides of the shaft, in a staggered arrangement. Such grooves may have a substantial depth $d_g$ of at least 30%, at least 40% or at least 50% and at most 80% of the lateral extension e of the anchoring portion at that position.

Especially, in embodiments of this further group, the cross section may be generally S-shaped.

In this further group of embodiments, the joining element despite the reduced amount of material due to the grooves has a substantial mechanical strength with respect to loads acting in directions along a major axis parallel to the grooves, whereas the mechanical strength along a minor axis perpendicular thereto is reduced compared to a full cylinder. This is due to the staggered arrangement of the grooves leading to an effect comparable to a T-bar (or multiple T-bar) design.

Also, in this group of embodiments, if the depth and shape of the grooves is chosen accordingly, the homogeneity of the material strength is especially high.

The invention further concerns an apparatus for carrying out the method described hereinbefore. To this end, the apparatus includes a joining element positioner for positioning the joining element relative to an object, a holding device for holding the object and a sonotrode for pressing the joining element towards a distal direction and at the same time coupling mechanical vibration energy into the joining element in an amount and for a time sufficient for liquefaction of a portion of the thermoplastic material to cause interpenetration of the thermoplastic material into structures of the object. The apparatus is further configured to leave the lateral outer surface of the head portion of the joining element intact.

The function of leaving the lateral outer surface of the head portion intact may, for example, be done by a mechanism that stops any forward movement of the sonotrode (that impinges on the joining element) as soon as a predetermined condition is met. This predetermined condition may especially be that an outcoupling face of the sonotrode has reached a position at a predetermined distance from the object—for example a distance corresponding to an axial extension of the head portion, possibly minus a small extra travel distance (of, for example, less than 1 mm) that accounts for a deformation of a proximal protrusion of the hereinbefore discussed kind or for deformations of the object in which the joining element is anchored.

In addition or as an alternative, the apparatus may include a mould tool so as to be capable of carrying out the method according to the fifth group of embodiments referred to hereinbefore.

Generally, in all aspects and concepts of the invention, the material of the object at least where the joining element is to be anchored needs to be penetrable by the liquefied thermoplastic material. A penetrable material suitable for the method according to the invention is solid at least under the conditions of the method according to the invention. It further includes (actual or potential) spaces into which the liquefied material can flow or be pressed for the anchoring. It is, e.g., fibrous or porous or includes penetrable surface structures which are, e.g., manufactured by suitable machining or by coating (actual spaces for penetration). Alternatively, the penetrable material is capable of developing such spaces under the hydrostatic pressure of the liquefied thermoplastic material, which means that it may not be penetrable or only to a very small degree when under ambient conditions. This property (having potential spaces for penetration) implies, e.g., inhomogeneity in terms of mechanical resistance. An example of a material that has this property is a porous material whose pores are filled with a material that can be forced out of the pores, a composite of a soft material and a hard material or a heterogeneous material in which the interfacial adhesion between the constituents is smaller than the force exerted by the penetrating liquefied material. Thus, in general, the penetrable material includes an inhomogeneity in terms of structure ("empty" spaces such as pores, cavities etc.) or in terms of material composition (displaceable material or separable materials).

Examples of penetrable materials applicable in the method according to the invention are solid materials such as wood, plywood, chipboard, cardboard, concrete brick material, porous glass, foams of metal, ceramic, or polymer materials, or sintered ceramic, glass or metal materials, wherein such materials can include spaces into which the thermoplastic material can penetrate which spaces are originally filled with air or with another displaceable or compressible material. Further examples are composite materials that have the above stated properties or materials with surfaces including a suitable roughness, suitable machined surface structures or suitable surface coatings (e.g. consisting of particles). If the penetrable material has thermoplastic properties, it is necessary that it maintains sufficient mechanical strength during the anchoring step, either by further including a mechanically stable phase, or by having a considerably higher melting temperature than the thermoplastic material to be liquefied in the anchoring step.

A thermoplastic material suitable for the method according to the invention is solid at room temperature (or at a temperature at which the method is carried out). It preferably includes a polymeric phase (especially C, P, S or Si chain based) that transforms from solid into liquid or flowable above a critical temperature range, for example by melting, and re-transforms into a solid material when again cooled below the critical temperature range, for example by crystallization, whereby the viscosity of the solid phase is several orders of magnitude (at least three orders of magnitude) higher than of the liquid phase. The thermoplastic material will generally include a polymeric component that is not cross-linked covalently or cross-linked in a manner that the cross-linking bonds open reversibly upon heating to or above a melting temperature range. The polymer material may further include a filler, e.g. fibres or particles of material that has no thermoplastic properties or has thermoplastic properties including a melting temperature range that is considerably higher than the melting temperature range of the basic polymer.

Examples for the thermoplastic material applicable in the method according to the invention are thermoplastic polymers, co-polymers or filled polymers, wherein the basic polymer or co-polymer is e.g. polyethylene, polypropylene, polyamides (in particular Polyamide 12, Polyamide 11, Polyamide 6, or Polyamide 66), Polyoxymethylene, polycarbonateurethane, polycarbonates or polyester carbonates, acrylonitrile butadiene styrene (ABS), Acrylester-Styrol-Acrylnitril (ASA), Styrene-acrylonitrile, polyvinyl chloride, polystyrene, or Polyetherketone (PEEK), Polyetherimide (PEI), Polysulfon (PSU), Poly(p-phenylene sulfide) (PPS), Liquid crystal polymers (LCP) etc. LCPs are of particular interest since their sharp drop in viscosity during melting enables them to penetrate in very fine spaces in the penetrable material.

For certain applications, especially if the mechanical vibrations are to propagate for a substantial distance with the thermoplastic material, an elasticity coefficient (at ambient temperature) of at least 0.5. GPa or preferably of at least 1.0 GPa may be advantageous.

Mechanical vibration or oscillation suitable for the method according to the invention has preferably a frequency between 2 and 200 kHz (even more preferably between 10 and 100 kHz, or between 10 or 15 kHz and 50 kHz or between 18 kHz and 30 kHz or 40 kHz) and a vibration energy of 0.2 to 20 W per square millimeter of active surface. The vibrating tool (e.g. sonotrode) is, e.g., designed such that its contact face oscillates predominantly in the direction of the tool axis (longitudinal vibration) and with an amplitude of between 1 and 100 µm, preferably around 30 to 60 µm. Such vibrations are, e.g., produced by ultrasonic devices as, e.g., known from ultrasonic welding.

BRIEF DESCRIPTION OF THE DRAWINGS

Hereinafter, principles and embodiments of the invention are described in further detail in connection with appended Figures, which are all schematic. In the drawings, same reference numbers refer to same or analogous elements. The figures show:

FIG. 3 is a variant of the joining element of FIG. 2a;

FIGS. 6-7 shows longitudinal sections illustrating further joining elements;

FIG. 8 shows longitudinal sections illustrating anchoring an even further joining element by a method according to the invention;

FIGS. 9-10 show variants of the joining element of FIG. 8;

FIG. 11 shows a longitudinal section illustrating anchoring a joining element in a board with an end face having a non-perpendicular angle to the board plane;

FIG. 12 is a longitudinal section illustrating anchoring a further joining element by a method according to the invention;

FIG. 13 is a variant of the joining element of FIG. 13;

FIG. 14 shows longitudinal sections of a joining element including two separate parts;

FIGS. 15a-15b shows longitudinal sections illustrating anchoring a further joining element including two separate parts;

FIGS. 26-29 are transversal sections (sections perpendicular to the insertion axis) of anchoring portions of further embodiments of joining elements;

FIGS. 30-32 show details illustrating further embodiments of the first group of embodiments;

FIGS. 35a and 35b show further embodiment of a joining element; and

FIGS. 36 and 37 show principles of an apparatus for carrying out the method.

DESCRIPTION OF THE PREFERRED EMBODIMENTS

Figure 1A:
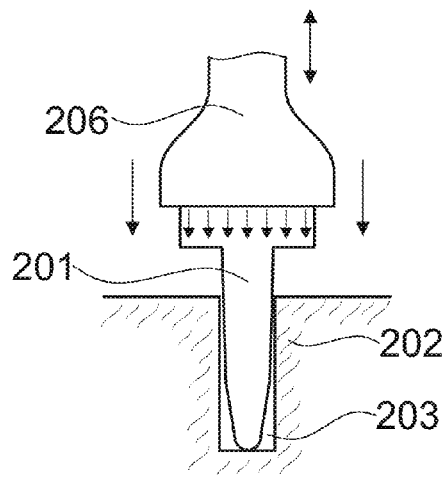
FIGS. 1a and 1b are longitudinal sections (sections along a plane parallel to the axis) illustrating anchoring of a joining element according to the prior art.
Figure 1B:
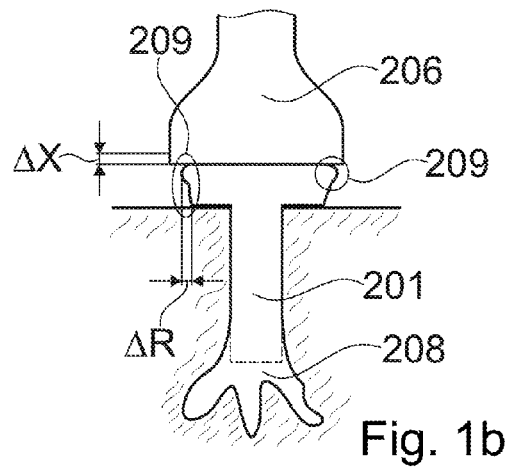
Figure 2A:
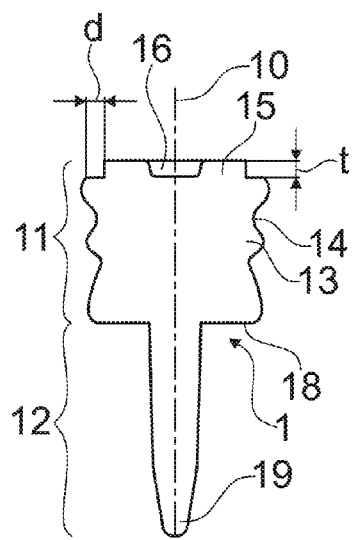
FIGS. 2a-2e are longitudinal sections illustrating anchoring a joining element by a method according to the invention.

A joining element 1 as illustrated in FIG. 2a includes a head portion 11 and an anchoring portion 12. Between the head portion and the anchoring portion, a distally facing shoulder 18 is formed, which shoulder serves as stop face in the anchoring process described hereinafter.

The joining element 1 may be essentially symmetric with respect to a rotation around its axis 10, with the possible exception of energy concentrating elements (not shown in FIG. 2a), such ribs or humps, of an outer surface of the anchoring portion 12.

The head portion 11 has a lateral outer surface that is shaped to engage into a corresponding structure of a female part of a further object so that the object into which the joining element is anchored and the further object may be assembled to one another. Especially, the lateral outer surface has a structure 13 that makes a positive-fit connection with the female part possible, in a manner that forces in axial directions (with respect to the axis 10) can be transferred between the head portion 11 and the female part in a positive-fit manner (in positive-fit connections, the connecting force in contrast to frictional fits has a component perpendicular to the surface—the joined objects are in each other's way).

More in particular, in the depicted embodiment, the head portion has at least one groove 14.

In this embodiment and in any other embodiment discussed in this text, the head portion may be shaped according to the teaching of WO 2013/104422, incorporated herein by reference in its entirety, and has the function to serve as male part of a joint described therein.

The head portion 11 further has a proximal protrusion 15 that is ring-shaped and has a thickness (axial extension) t of typically 2 mm or less. A radial extension of the proximal protrusion 15 is less than an extension of the lateral outermost surface 14 of the head portion 11 by a significant difference d of for example at least 0.5 mm, or at least 1 mm. A proximally facing coupling surface constituted by the proximal protrusion is perpendicular to the axis 10 and is flat, with the optional exception of a guiding hole 16 (that may optionally axially extend further into the head portion than illustrated and possibly even into the anchoring portion) that may serve to align the joining element with a sonotrode, for example by cooperating with an according guiding protrusion 61 of the sonotrode.

In the embodiment of FIG. 2a, the joining element is one-piece and consists of a thermoplastic material.

Figure 2B:
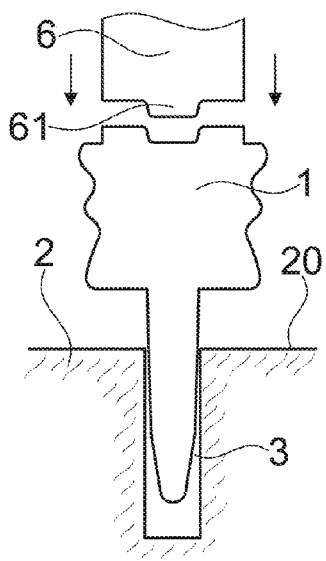

A sonotrode 6 is used to carry out the anchoring process, as illustrated in FIG. 2b. The shape of a distal coupling face of the sonotrode is adapted to the shape of the proximal end face of the joining element.

In order to carry out the process, the joining element is placed relative to the object 2 in a manner that the anchoring portion 12 protrudes into an opening 3 in the object. The opening may be dimensioned, as schematically illustrated in FIG. 2b and for example taught in WO 98/042988, to have a radial extension slightly larger than the radial extension of the anchoring portion, so that the anchoring portion may be inserted essentially force-free. Alternatively, it is also possible to dimension the opening such that upon introduction of the joining element, an interference fit results between the joining element and the object, as for example taught in Swiss patent application 00 824/14 incorporated herein by reference in its entirety.

In FIG. 2b also the surface 20 of the object is shown, in which surface 20 the opening 3 has a mouth, i.e. from which surface 20 the opening extends into the interior of the object 2.

Figure 2C:
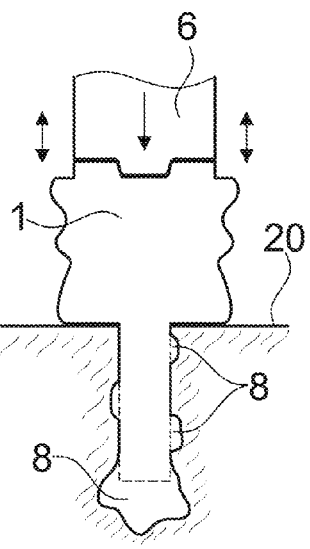

During the process, the sonotrode 6 presses the joining element into a distal direction against the object while vibrations are coupled from the sonotrode 6 into the joining element via the coupling faces until the thermoplastic material under the effect of the vibrations and pressure starts liquefying and is pressed into structures of the object, as illustrated in FIG. 2c. This will result in a zone 8 in which the object is interpenetrated by the thermoplastic material, which, after re-solidification, leads to a positive-fit connection between the joining element 1 and the object 2.

The anchoring portion 12 may include energy directing features such as a distal tip 19 and/or radial ribs or humps or other features. Such energy directing features proximally of the distal end (the region of the joining element proximally of the distal end and distally of the head portion may be referred to as "shaft portion") may cause liquefaction and thus ultimately an interpenetration zone 8 also laterally around the shaft portion, as illustrated in FIG. 2c.

Due to a non-perfect coupling between the sonotrode 6 and the proximal surface of the joining element, in an interface zone immediately adjacent the coupling face, and due to the contact pressure, some deformation of the thermoplastic material may arise during the process. Because of the pressing force, this will lead to thermoplastic material being pressed out into lateral directions. Due to the deformation zone, such material portions 9 that have flown out will not interfere with the structured lateral outermost surface.

Figure 2D:
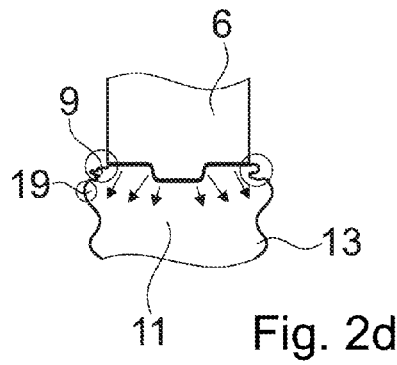

Also, due to the construction with the interface not reaching radially as far as the lateral outermost surface, the mechanical load on that zone 19 of the lateral outermost surface that is the closest to the sonotrode 6 is subject to a comparably minimal mechanical load (the arrows in FIG. 2d schematically illustrate the mechanical load) and, thus, will not be subject to any tendency to become deformed.

Figure 2E:
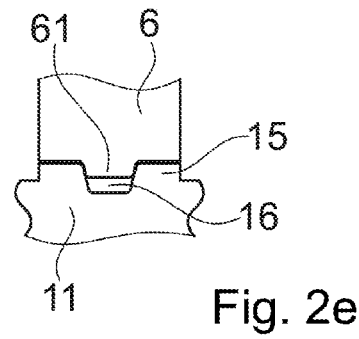

In practice, the relative dimensions of a (optional) guiding protrusion 61 of and of a (also optional) guiding hole 16 of the head portion 11 may be adapted to each other so that the guiding protrusion does not reach to the ground of the guiding hole 16, as illustrated in FIG. 2e. Thereby, it is clearly defined that the pressing force and the vibrations are coupled into the joining element only via the protrusion 15, with no portion being coupled into the bottom of the guiding hole, making the system particularly well-defined.

Figure 3:
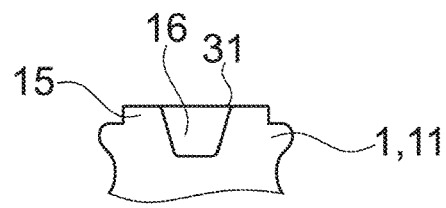

The proximal-most part of a variant of the joining element of FIG. 2a is depicted in FIG. 3. In this variant, firstly the guiding hole 16 is more pronounced. Secondly, the guiding hole is conical. Thirdly, there is a smooth transition between the side walls of the guiding hole and the proximal coupling face. The smooth transition is provided in the form of a curved section 31 of the surface. Due to this curved section, the stress upon the interface zone is further reduced.

Figure 4A:
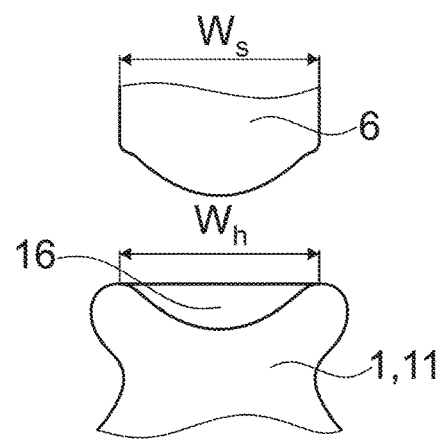
FIGS. 4a-4b show details of longitudinal sections illustrating anchoring another joining element by a method according to the invention.

FIG. 4a yet shows a variant with a non-plane coupling face. The coupling face of the joining element 1 is continuously curved to cooperate with a correspondingly curved outcoupling face of the sonotrode 6. Also this design leads to a stress distribution without local stress concentrations at the interface.

Figure 4B:
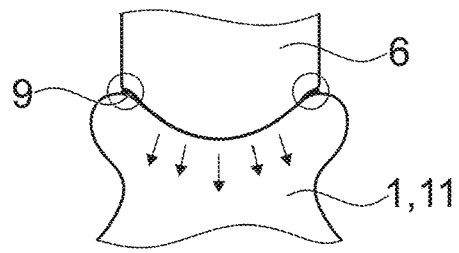

Additionally, the width Ws of the sonotrode, as in the previous embodiment, is smaller than the width $W_H$ of the head portion. Therefore material portions 9 that have flown out because of a local softening of the thermoplastic material in the deformation zone will again not interfere with the structure of the outermost surface part of the head portion 11, as illustrated in FIG. 4b.

FIG. 30 shows another variant with a non-plane coupling face. In contrast to the embodiment of FIGS. 4a and 4b, the coupling face of the joining element 1 is convexly curved instead of concavely, and the coupling face of the sonotrode 6 is concavely curved instead of convexly.

An even further embodiment that is similar to the embodiment of FIG. 2a is depicted in FIG. 31. In the embodiment of FIG. 31, the joining element has a guiding protrusion 17 cooperating with a guiding indentation 63 of the sonotrode 6, instead of the opposite.

In the embodiment of FIG. 32, the joining element does not have a proximal protrusion. Rather, the lateral extension of the sonotrode 6 that is placed in a well-defined position relative to the joining element 1, for example by a guiding protrusion 61 cooperating with a corresponding guiding indentation 16 of the joining element, ensures that the outer lateral surface of the head portion remains intact. To this end, the difference d correspond to about the depth f of the indentations of the lateral outer surface or is larger than the same so that the sonotrode cannot put any force on an undercut of the head. Thus in some embodiments, the condition d>=f holds.

In accordance with an even further variant (see, for example, FIG. 36 further below), the sonotrode may have no guiding feature at all. Especially, in embodiments in which the joining element has a proximal protrusion 15, the lateral extension of the distal sonotrode outcoupling face may be somewhat larger than the surface of the proximal protrusion 15. Then, an exact positioning of the sonotrode relative to the joining element is not necessary for preventing a deformation of the lateral outer surface of the head portion.

The embodiments described referring to FIGS. 2a-4b are embodiments of the first group of embodiments implementing the first concept.

Figure 5:
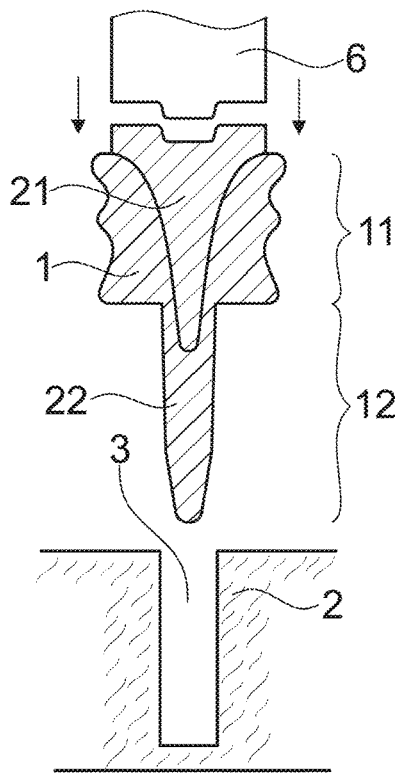
FIG. 5 is a longitudinal section illustrating anchoring yet another joining element by a method according to the invention.

An example of an embodiment of the second group of embodiments implementing the first concept is depicted in FIG. 5. The joining element in contrast to the previously described embodiments is not one-piece but includes two parts, a liquefiable part 22 and a non-liquefiable part 21. The non-liquefiable part 21 is approximately nail shaped with the proximal-most section forming the coupling face. The lateral outermost portion of the head portion 11 as well as the anchoring portion are constituted by the liquefiable part 21.

In an example, the non-liquefiable part is made of a metal or of wood or of a thermosetting plastic or of a thermoplastic with a glass transition temperature substantially above the glass transition temperature of the liquefiable part.

Figure 6:
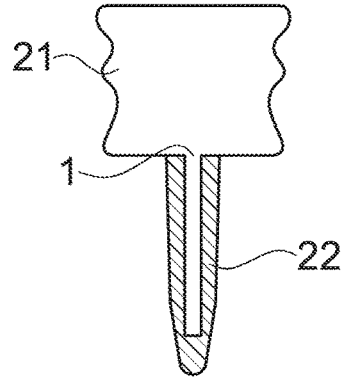

The embodiment of FIG. 6 is a further example of the second group of embodiments. In this example, the head portion (head) entirely belongs to the non-liquefiable part 21 and is for example made of wood or a non-liquefiable plastic.

The non-liquefiable part in the depicted embodiment also includes a shaft portion extending into the anchoring portion, with the liquefiable part being essentially provided as coating of the shaft portion.

FIG. 7 shows yet another example of a joining element with a coupling face of a non-liquefiable material. The coupling face is constituted by a plate portion 25 of a non-liquefiable part 21, the non-liquefiable part further including a spike portion 26 extending distally from the plate portion and enhancing the mechanical coupling between the non-liquefiable part and the liquefiable part.

FIG. 8 depicts an embodiment of the third group of embodiments, implementing the second concept. The joining element 1 is one-piece and consists of thermoplastic material. It has a recess 33 open to the proximal side, with a bottom of the recess defining a coupling face 30 for a sonotrode 6 dimensioned so that its distal end can be introduced into the recess 33 with its distal coupling-out face pressing against the coupling face 30.

The aspect ratio of the recess is, for example, e at least 0.5 or at least 1; in the depicted embodiment it is about 1.5.

The embodiment of FIG. 9 is distinct from the embodiment of FIG. 8 in that the recess 33 is not cylindrical but has a surface shaped that is curved in axial section. The coupling face 30 is constituted by the inner surface of the joining element in the recess (or the portions thereof that are not parallel to the axis), with the less steep portions and the portions at the ground of the recess being subject to higher pressing forces than the steeper portions. Due to the concave shape, this automatically brings about a force distribution that preserves the more proximal and more lateral sections of the head portions.

Yet another variant is shown in FIG. 10. The recess 33 has a stepped surface, with the coupling face 33 being distributed over the steps and the ground of the recess.

The embodiments of FIGS. 9 and 10 are examples of embodiments in which recess extends into a substantial part of the head portion so that the head portion is constituted by an approximately tuboid body the material strength s of which varies within a certain range. Due to this design, the shape of the joining element 1 is optimized for injection molding. In injection molding often solid volumes have the potential problem of being difficult to entirely fill without any bubble formation. Designs like the ones of FIGS. 9 and 10 (as well as a variant of the design of FIG. 8 with the recess axially extending essentially through the entire head) solve this problem in the head region.

Designs like the ones of FIGS. 9 and 10 may therefore be especially advantageous in embodiments where the joining element is a one-piece injection molded object.

Designs like the ones of FIGS. 8-10 may also be used for embodiments in which the recess 33 mainly serves as guiding hole with the sonotrode also acting on the proximal end face, especially embodiments of the first group of embodiments. Of course, also combinations are possible, in which the coupling face is partly constituted by the proximal end face around the rim of the recess and partly by the bottom and/or side face and/or shoulders of the recess.

Also in the variant of FIG. 11, the joining element 1 consists of the thermoplastic material. In this variant, compared to the embodiment of FIG. 8, the anchoring portion 12 has a comparably reduced axial extension and/or a larger radial width. Also, the recess 33 extends further into the joining element. These differences (reduced axial extension of the anchoring portion, enhanced radial with, enhanced axial extension of the recess) may all be implemented independently or in any combination.

A larger radial width may at least partly compensate the reduction of anchoring strength due to the anchoring portion being shorter. An enhanced depth of the recess 33 may in certain configurations make a liquefaction of the thermoplastic material over an entire width of the anchoring portion easier because the sonotrode is close to the liquefaction site, and may therefore be operated with higher power and/or higher frequencies without risking any deformation of the head portion.

Embodiments like the ones of FIG. 11 with a shorter anchoring portion may especially be suited for configurations in which the joining element is anchored in a comparably thin object 2 and/or in situations in which the joining element has to be anchored in a board-like object along an edge, where the narrow side surface along the edge is at a non-rectangular angle to the board plane, for example at 45° or, more generally, at an angle between 30° and 60°, especially between 35° and 55°—as schematically illustrated in FIG. 11.

Figure 33A:
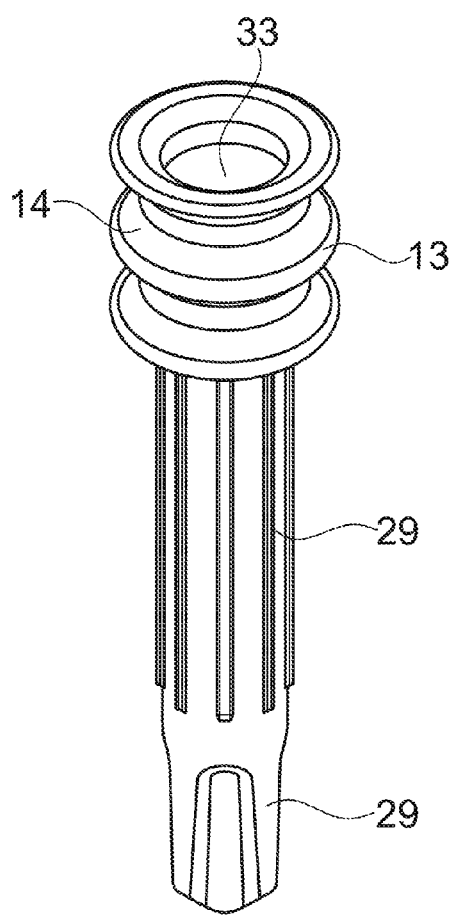
FIGS. 33a and 33b show an embodiment of a joining element of the third group.
Figure 33B:
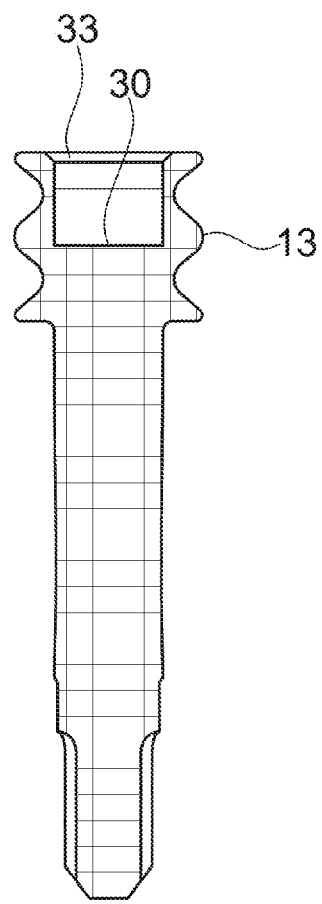

FIGS. 33a and 33b show, in a view and in a cross section, respectively, a further example of an embodiment according to the third group. In addition to the features described referring to FIG. 8, in the figures also the energy directors 29 are illustrated. The energy directors may be provided in the form of ribs or humps or steps and have the function of causing a particularly pronounced absorption of mechanical vibration energy so as to cause an onset of liquefaction there—similar to energy directors known from ultrasonic welding.

FIG. 12 illustrates a further variant of an embodiment of the third group of embodiments. It also belongs to the second group of embodiments. In contrast to the embodiment of FIG. 8, the coupling face is a surface of a non-liquefiable part 21, namely of a coupling plate arranged at the bottom of the recess 33.

FIG. 13 shows an embodiment where the non-liquefiable part 21 coupling plate has a plate portion 25 and a spike portion 26 extending distally from the plate portion.

Generally, embodiments that have a liquefiable part and a non-liquefiable part may be manufactured by injection-molding the liquefiable part in presence of the non-liquefiable part (insert molding/overmolding). However, it is also possible to manufacture the liquefiable part and the non-liquefiable part as separate items and to assemble them thereafter.

This is illustrated for the variant of FIG. 14. The liquefiable part comprises, in addition to the recess 33 and extending distally therefrom a stepped opening for the non-liquefiable part 21 including a broader section 34 for the plate portion 25 and a narrower section 35 for the spike portion 26.

The plate portion 25 further forms a guiding hole 16 for the sonotrode (which guiding hole is an optional feature for the other embodiments, too).

While the option to assemble the liquefiable and non-liquefiable parts after manufacturing in this description is illustrated referring to FIG. 14 and some of the following figures, it is an option also for other embodiments. On the other hand, it would be possible to manufacture a joining element 1 having features like the ones illustrated in FIG. 14 or having the shape and/or a coupling structure of joining elements described hereinafter also by insert molding/overmolding or the like.

Referring to the embodiment of FIG. 14, yet another optional feature is illustrated: The opening 33, 34, 35 axially extends through the entire liquefiable part to the distal end. This cannulation may have advantages in the manufacturing process, namely it may prevent void formation in the injection molding process. This advantage is independent on whether the joining element 1 is manufactured by insert molding/overmolding or whether it is assembled in a subsequent step.

The cannulation feature of the embodiment of FIG. 14 may be implemented also in the other embodiments, both for one-piece joining elements consisting of thermoplastic material or for elements including a plurality of parts.

Again referring to the joining elements including a plurality of initially separate parts, in accordance with an option, the assembly of the parts may be done after the step of causing interpenetration of structures of the object by portions of the thermoplastic material. In this, the steps of pressing the joining element towards a distal direction and coupling mechanical vibration into the joining element concerns the part that has the thermoplastic material only.

An according embodiment is illustrated in FIGS. 15a and 15b. The liquefiable part 22 is one-piece and consists of the thermoplastic material. It has a shaft portion 36 for being introduced into the opening in the object 2 and for being anchored therein, and a coupling portion 37 for cooperating with an according coupling feature 39 of the non-liquefiable part 21. In the depicted embodiment, it further includes a broadening portion 38 that may cause an additional anchoring near the object surface and/or serve as stop defining the anchoring depth.

In the depicted embodiment, the coupling between the liquefiable part 22 and the non-liquefiable part 21 (that again may be made of wood or a non-liquefiable plastic) is a mechanical snap fit coupling. Small deformations of the proximal-most portion of the liquefiable part during anchoring do not disable the coupling in any way.

If other couplings with a more critical mechanism were chosen, measures described in this text (such as a controlled deformation zone, an offset coupling face, etc.) may be used for the liquefiable part 22 to keep the portion that couples to the non-liquefiable part functional.

Figure 16:
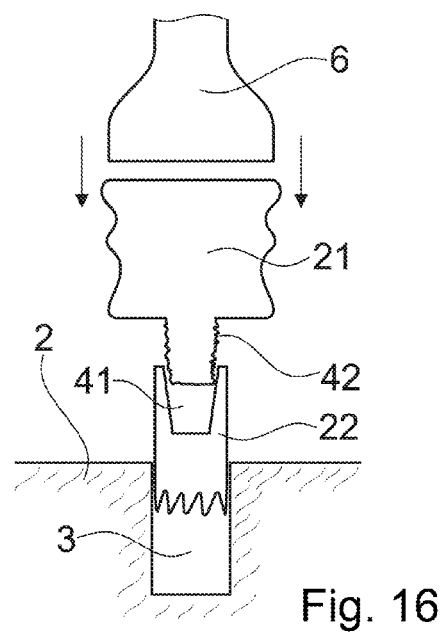
FIG. 16 shows longitudinal sections illustrating anchoring yet another joining element including two separate parts.

As an alternative to assembling the parts prior to the insertion and to assembling the parts after the anchoring, assembly may also be made during the process. This principle is illustrated in FIG. 16. The liquefiable part 22 is positioned relative to the object 2, and the non-liquefiable part 21 is positioned relative to the liquefiable part when the sonotrode both, presses the parts together and presses the parts against the object when the vibrations are coupled into it.

For example, the liquefiable part 22 includes a proximal recess, such as a conical or cylindrical recess 41, into which a corresponding distal protrusion 42 of the non-liquefiable part is placed in the step of positioning.

By the effect of the pressure and vibrations, not only thermoplastic material of the liquefiable part is liquefied to penetrate into structures of the object but also a fit between the liquefiable and non-liquefiable parts results.

Figure 17A:
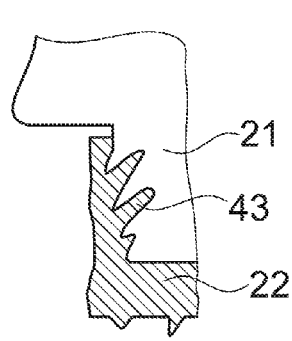
FIGS. 17a-17c show details of connections between joining element parts and the anchoring in longitudinal section.
Figure 17B:
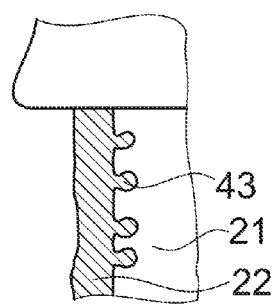

FIGS. 17a and 17b show, schematically, a detail of the connection between the liquefiable part and the non-liquefiable part after the process in two variants. The non-liquefiable part includes structures that form, an undercut, such as pores 44, grooves, etc. into which the liquefiable material is pressed after it has become flowable. After re-solidification, this results in a positive-fit connection between the liquefiable and non-liquefiable parts.

Figure 17C:
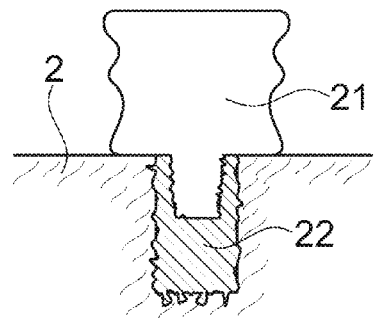

FIG. 17*c* shows that the thermoplastic material of the liquefiable part 22 by the impinging mechanical vibration energy has liquefied both, to interpenetrate structures of the object 2 as well as of the non-liquefiable part 21.

Figure 18:
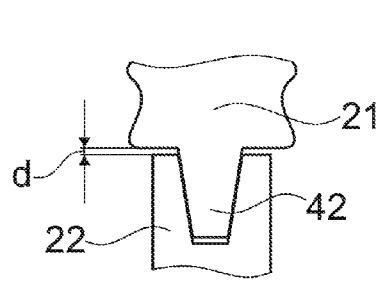
FIGS. 18-19 show a connection between parts of a further joining element, and such a further joining element after anchoring.

In addition or as an alternative, the connection may include a press fit connection, as schematically illustrated in FIG. 18. To this end, the non-liquefiable part includes a slightly conical protrusion 42 (in the Figure, the opening angle of the cone is drawn somewhat exaggerated) and is pressed into a slightly undersized corresponding opening of the liquefiable part. FIG. 18 illustrates the situation before a force is applied, with a distance d remaining. As a result of the pressing the non-liquefiable part 21 is advanced relative to the liquefiable part by at most the distance d and thereby a press fit results. A possible slight elastic deformation may assist the fitting effect. Additionally effects like a surface roughness, or adhesion may contribute.

Combinations with the positive-fit approach described referring to FIGS. 17*a* and 17*b* are possible.

Figure 19:
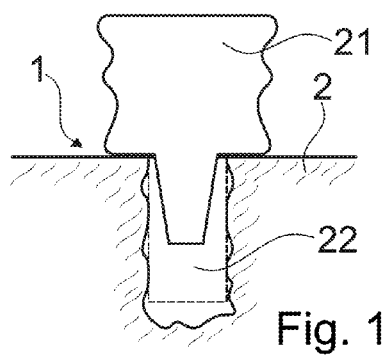

FIG. 19 illustrates an example of a joining element of the kind described referring to FIGS. 16-18 anchored in an object.

Figure 20:
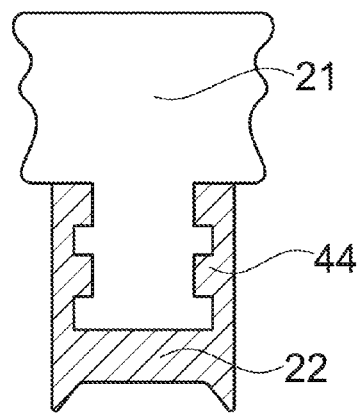
FIGS. 20-21 show longitudinal sections of yet further joining elements composed of two parts.

The embodiment of FIG. 20 may be of a pre-manufactured (molded; assembled prior to the anchoring) kind, or may be assembled in-situ during the anchoring process as described referring to FIGS. 17-19. Instead of the rather small pores or grooves, the non-liquefiable part has a shaft portion with at least one proximally facing shoulder that in the shown embodiment shows distally of a groove 44. Such a shoulder may, in analogy to the embodiments of FIGS. 17-19, cause a positive-fit connection between the liquefiable and non-liquefiable parts.

The embodiment of FIG. 20 has a relatively short, relatively wide anchoring portion with at least one ring-shaped distal protrusion serving as energy director. Instead of such a ring-shaped protrusion or a tip as described hereinbefore, a distal energy director may have another shape and for example include a plurality of ribs, humps, etc.; like in all other embodiments there may be in addition or as an alternative an energy director on the lateral surface of the anchoring portion shaft.

Figure 21:
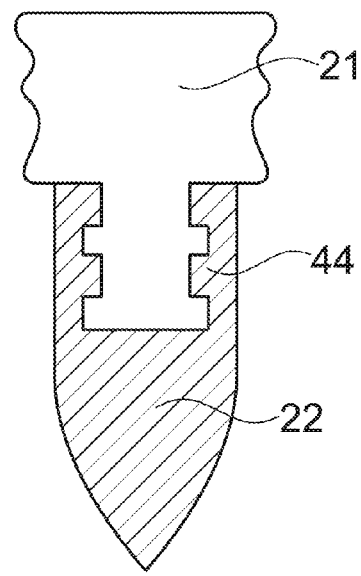

The embodiment of FIG. 21 is distinct from the embodiment of FIG. 20 in that the anchoring portion is more elongate and has a distal tip.

Figure 22:
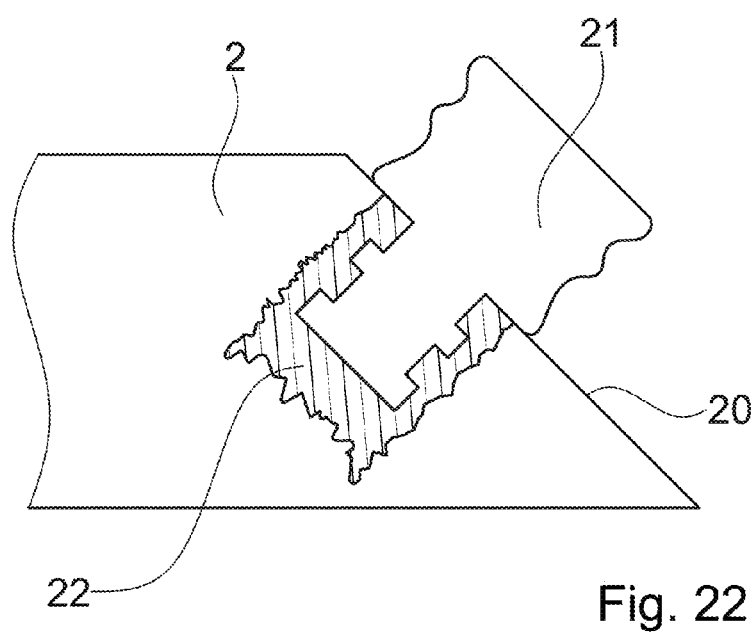
FIG. 22 shows a joining element as shown in FIG. 20 anchored in a board with an end face having a non-perpendicular angle to the board plane.

Generally, wider and shorter anchoring portions are suited for anchoring on a large surface of a board or other object with limited depth, or for anchoring on a narrow side at a non-perpendicular angle to the large surface (flat side; the board plane), as illustrated, for joining element of the kind shown in FIG. 21, in FIG. 22. Longer anchoring portions are suitable for anchoring in bulky objects or on the small side of boards if the narrow side is at a perpendicular angle to the flat side.

Figure 23A:
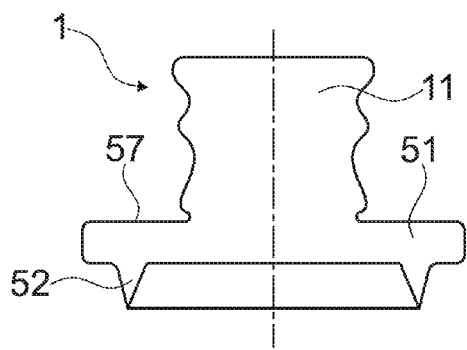
FIGS. 23a-25 are yet another joining element in top view and a longitudinal section and a top view of a sonotrode usable for anchoring it.
Figure 23B:
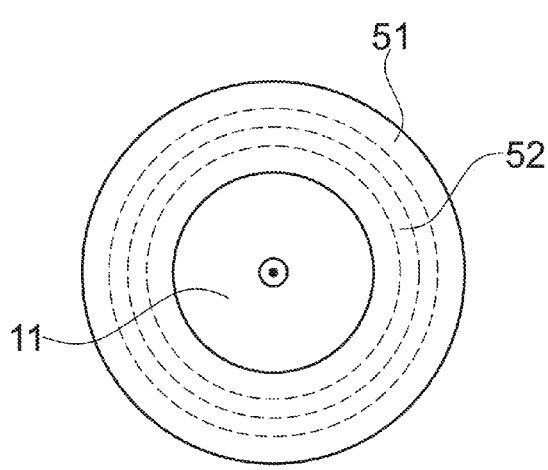

An embodiment of the fourth group of embodiments is depicted in FIGS. 23*a* and 23*b*. The anchoring portion includes an anchoring portion body 51 with an angular ridge-shaped distal protrusion 52. The anchoring portion body 51 generally has a disc-shape, with the head portion being concentric with the anchoring portion body 51, and with the width of the head portion 11 being smaller than the width of the anchoring portion body. The coupling face 57 is formed around the head portion 11.

Like in other embodiments of the fourth group of embodiments, the distal protrusion is placed axially underneath the coupling face 57 and not for example underneath the center of the head portion 11.

As to a single ridge-shaped protrusion forming a ring around the lateral position of the head portion a plurality of concentric such protrusion rings could be present.

The opening 3 in the object has in-plane (lateral) dimensions that match the corresponding dimensions of the anchoring portion body 51. The depth of the opening approximately corresponds to the thickness (axial extension) of the anchoring portion body without the protrusions.

The anchoring body portion 51 may have—this being an optional feature for all embodiments—further energy directors on lateral sides.

Figure 24A:
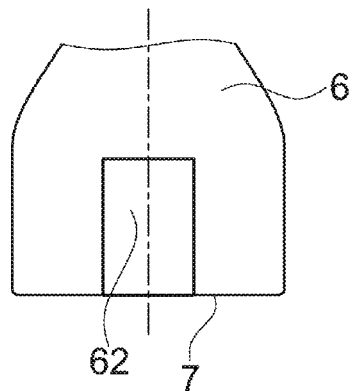
Figure 24B:
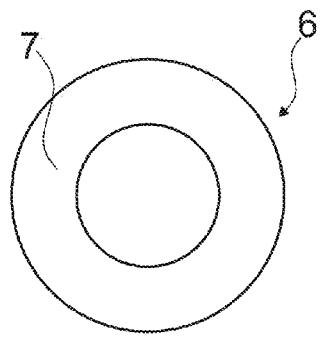

An example of a sonotrode 6 suitable for the joining element 1 of FIGS. 23*a* and 23*b* and also for the joining element of FIG. 25 described hereinafter is shown in FIGS. 24*a* and 24*b*. The sonotrode is generally dome-shaped with an open space 62 being dimensioned to accommodate the head portion 11.

The distal end face forms the outcoupling face 7 of the sonotrode. For the anchoring process, the joining element is placed with the anchoring portion body above the mouth of the opening 3 or in the opening 3, and the sonotrode is positioned relative to the joining element with the outcoupling face 7 against the coupling face 57 and the head portion protruding into the open space 62. The sonotrode may yet include an optional guiding protrusion (not shown) proximally of the open space cooperating with a proximal guiding hole of the head portion 11 to define the exact position.

Under the common effect of the pressing force and the mechanical vibrations, the thermoplastic material of the protrusion 52 as well as, if present, thermoplastic material at the lateral energy directors is caused to liquefy and to thereby anchor the joining element in the object 2.

Figure 25:
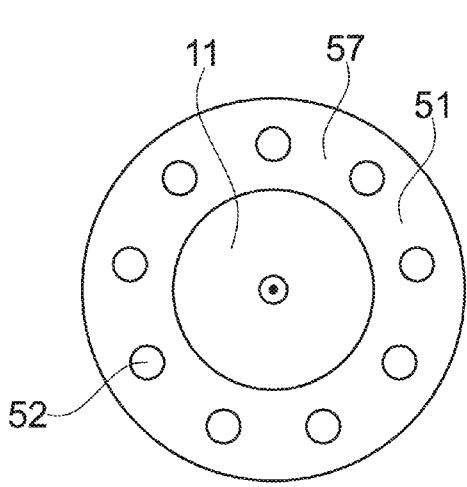

FIG. 25 yet illustrates another embodiment. The anchoring portion may for example include a plurality of spike-like protrusions 52 arranged regularly around the head portion, distally of the anchoring portion body 51.

Figure 34:
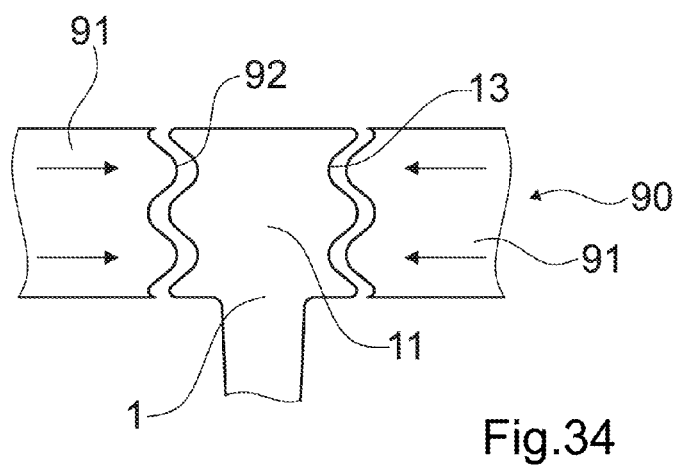
FIG. 34 show the principle underlying the fifth group.

FIG. 34 illustrates an embodiment of the fifth group of embodiments. A mould 90 including two shells 91, each having a surface portion 92 that corresponds to a negative of the lateral outer surface structure 13 of the head portion 11, is placed relative to the joining element 1 for the anchoring process. During the step of pressing, the surface portion of the mould 90 remains in contact with the surface structure 13. During possible forward movements of the joining element, the mould makes the same movement. For example, to this end the mould shells 91 may be coupled to a frame that also carries a transducer to which the sonotrode is coupled. If any softening or melting of the head portion 11 would occur during the step of pressing, the outer surface structure 13 of the head portion 11 would still be kept intact by the mould, and the mould is preferably released only after the head portion 11 has re-solidified, thereby maintaining its intended outer surface structure 13.

As an alternative to what is depicted in FIG. 34, the joining element may optionally also include features described hereinbefore referring to the first, second, third or fourth group of embodiments.

Hereinafter, referring to FIGS. 26-29, all showing cross sections through the anchoring portion perpendicular to the insertion axis, concepts of optimizing the design of the joining element in terms of injection molding according to the second aspect are discussed, in addition to the discussion referring to FIGS. 9, 10, 11 and 14.

Especially in embodiments where the anchoring portion has a comparably long and/or comparably thick shaft, the prevention of voids within the injection molded parts is an issue also in the region of the anchoring portion. This teaching thus applies to all embodiments with an anchoring portion consisting of the thermoplastic material, being substantially elongate and extending in an axial region away from the head portion, as for example the embodiments of FIGS. 2a-5, 7-22.

Figure 26:
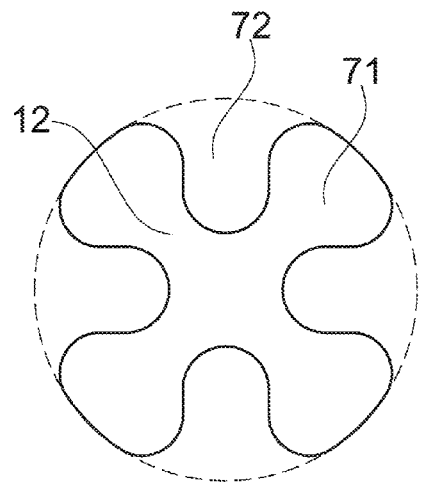

FIG. 26 shows a cross section through a shaft of an anchoring portion. The cross section deviates from a generally round shape (dotted line) in that it includes a plurality of lobes 71 with axially running grooves 72 therebetween. The grooves 72 are distinct from mere spaces between energy directing ribs in that they are deeper (for example, they have a depth of at least 10%, at least 15%, at least 20% or at least 25% of the diameter of the shaft), and that the lobe 71 between them does not peak in a sharp edge (this, of course, does not exclude the existence of one or more energy directing ribs or similar on such a lobe). Also, when inserted in the opening 3, the grooves will be within the space defined by a radial extension of the opening. After the anchoring process, the grooves optionally may remain empty and define a hollow space.

Different shapes of lobes 71 are possible, depending on a desired balance between mechanical strength and flow optimization during injection molding. FIG. 27 illustrates an according alternative cross section.

By the design that includes lobes with grooves therebetween, the distance between material portions in a center of the shaft and the mold walls is substantially reduced, this optimizing injection molding process.

In the embodiment of FIG. 28, the cross section through the shaft portion is generally S-shaped, thus with two staggered grooves of substantial depth extending from opposite sides into the volume of the shaft.

Especially, the grooves in the depicted configuration are as deep as to extend across a middle plane (perpendicular to the groove direction), i.e. the depth $d_g$ of the groove is greater than 50% of the local extension e at that place. Generally, the depth will be substantial, for example at least 30% or at least 40% or at least 50% of the extension.

This design features substantial advantages. Firstly, the homogeneity of the material strength in the above-discussed sense (differences between distances of innermost portions from a mold wall are comparably homogeneous) can be designed, by choosing appropriate shapes and depths of the groove, to be almost perfect. Secondly, by this design a main beam 81 and two side beams 82, 83 are formed that provide substantial mechanical strengths with respect to loads acting in directions along a major axis 85, whereas the mechanical strength along a minor axis 86 is reduced compared to a full cylinder (the major and minor axes are in-plane axes and not to be confused with the insertion axis that is perpendicular to the drawing plane in FIG. 28). In this, the mechanical stability becomes comparable to a T-bar (or multiple T-bar) design.

This teaching can be readily generalized to only one groove or to more than two staggered grooves (for example, as sketched in FIG. 29), for higher numbers of grooves at the price of increasingly lower stability in directions along the minor axis.

FIG. 28 also illustrates optional energy directing ribs 54. Optionally, the shaft can be designed to be slightly oversized in the direction of the minor axis, if the thermoplastic at insertion temperature is slightly elastic so that the construction provides a spring effect pressing the side beams 82, 83 against the wall of the opening.

For use, the joining element having an anisotropic shaft cross section as taught in FIG. 29 in the step of arranging/positioning the major axis is oriented along an axis along which the primary in-plane mechanical load is expected. Often, in the furniture industry or construction industry, this direction is well-defined by the application.

A further example of an embodiment combining the first and second aspects of the invention is illustrated in FIGS. 35a and 35b. FIG. 35b shows the joining element in longitudinal section, wherein the section plane is chosen to go through the axially running grooves 28 visible in FIG. 35a. The joining element 1 consists of thermoplastic material. It is configured according to the first group of embodiments of the first aspect of the invention and includes a proximal protrusion 15 of the kind described hereinbefore. The recess 33 in this embodiment does not serve for positioning the sonotrode (it may optionally but not necessarily serve as guiding indentation) but by extending through the entire head portion 11 it realizes the teaching of the second aspect of the invention.

The embodiment of FIGS. 35a and 35b also has energy directing structures 29. An apparatus 100 for carrying out the method is very schematically shown in FIG. 36. The apparatus has a positioning device 101 positioning the joining element 1 relative to the object 2 and the opening 3 therein, and a sonotrode 6. Further, the apparatus has a control 103 controlling the sonotrode 6 and the positioning device 101. The apparatus also has a holding device 104 for holding the object 2 during the anchoring process. The apparatus may have further means, such as a transporting device for conveying the object 2, a drilling device for making the opening 3, a storage for storing a stock of the joining elements, a feeder for feeding the joining elements 1, etc.

Furthermore, the apparatus 100 includes a distance sensor 102 adapted for sensing the distance DS between the sonotrode 6 and the object 2—more in particular in the depicted embodiment the distance between the coupling-out face of the sonotrode 6 and the surface 20 of the object—and connected to the control 103. The distance sensor 102 may be based on any suitable principle, such as laser distance measurement, radar distance measurement, ultrasonic distance measurement, and mechanical distance measurement. When a pre-set distance DS* between sonotrode 6 and object 2 has been reached, meaning that joining element 1 is in its correct final mounted position, as measured by means of distance sensor 102, the control 103 stops the further movement and vibrating action of sonotrode 6.

More particularly, the control 103 is configured to control a forward (distal) movement the sonotrode 6 undergoes when the vibrations and the pressing force are coupled into the joining element 1. Especially, the control 103 may be configured to stop a forward movement of the sonotrode 6 when the outcoupling face is at the predetermined distance DS=DS* from the surface 20 in which the opening 3 has a mouth. More in concrete, in embodiments the forward movement of the sonotrode stops as soon as the shoulder 18 (if any) reaches the surface 20. The pre-determined distance DS* thus may for example correspond to the axial extension e, possibly minus a small extra distance that accounts for a slight deformation of the object surface 20 and for a possible deformation of the proximal protrusion 15.

An alternative pre-determined condition that may be set to stop the forward movement of the sonotrode 6 is a sudden rise in mechanical resistance (due to the shoulder 18 abutting against the surface 20) or a sudden change in the vibration absorption characteristic, also caused by the shoulder 18 abutting against the surface 20.

This means for automatically stopping a forward movement is a further measure that protects the head portion from being deformed at the lateral outer surface.

Figure 37:
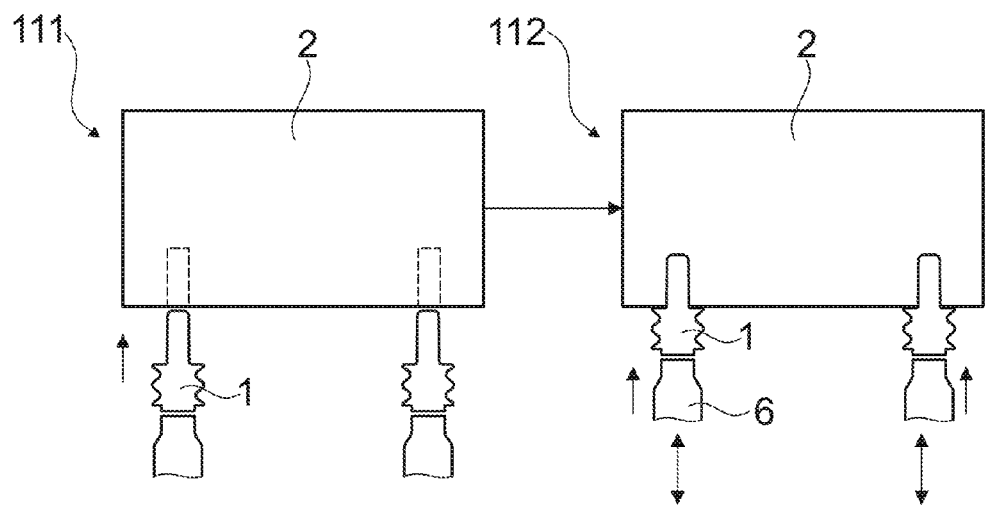

FIG. 37 yet very schematically illustrates that the apparatus may have different spatially separated stations for carrying out the different steps. For example, the apparatus may have a positioning station 111 in which the joining element(s) 1 is/are inserted in the object 2, for example with an interference fit, and an anchoring station 112 in which the sonotrode(s) 6 act(s) on the joining element(s) 1.

What is claimed is:

1. A method of anchoring a joining element in an object, the method comprising the steps of:
   providing a joining element, the joining element comprising an anchoring portion for in-depth anchoring in the object, and a head portion proximally of the anchoring portion, the head portion having a lateral outer surface with a well-defined structure, the lateral outer surface comprising at least one ridge or at least one groove or both, at least one ridge and at least one groove, the joining element comprising a thermoplastic material at least on a surface of the anchoring portion;
   positioning the joining element relative to the object in a manner that the anchoring portion reaches into an opening of the object or is placed adjacent a mouth thereof; and
   pressing the joining element towards a distal direction and at the same time coupling mechanical vibration energy into the joining element by a tool in an amount and for a time sufficient for liquefaction of a portion of the thermoplastic material to cause interpenetration of the thermoplastic material into structures of the object,
   wherein the method comprises leaving the lateral outer surface of the head portion intact.

2. The method according to claim 1, wherein an insertion axis is defined to be a proximodistal axis along which the pressing force is applied, wherein a surface of the object, in which the opening has a mouth, is plane, wherein a head portion axis is defined to be perpendicular to the plane surface of the object after anchoring, and wherein the head portion axis coincides with the insertion axis.

3. The method according to claim 1, wherein an insertion axis is defined to be a proximodistal axis along which the pressing force is applied, wherein a surface of the object, in which the opening has a mouth, is plane, wherein a head portion axis is defined to be perpendicular to the plane surface of the object after anchoring, and wherein the head portion axis is at a nonzero angle to the insertion axis.

4. The method according to claim 1, wherein the head portion is symmetrical about rotations around a head portion axis.

5. The method according to claim 1, wherein the pressure and the mechanical vibration are applied by pressing the tool against a proximal end face of the head portion.

6. The method according to claim 5, wherein in the step of pressing, a coupling-out face of the tool is pressed against the proximal end face of the joining element, a tool-joining-element-interface being formed between the coupling-out face and the proximal end face, wherein the interface has a smaller radial extension than a radial extension of the head portion.

7. The method according to claim 6, wherein the head portion comprises a proximal protrusion a radial extension of which is smaller than the radial extension of the head portion.

8. The method according to claim 7, wherein the proximal protrusion is ring-shaped or disc-shaped.

9. The method according to claim 6, wherein the coupling-out face of the tool has a radial extension which is smaller than the radial extension of the head portion.

10. The method according to claim 1, wherein the head portion comprises a recess open to the proximal side, and wherein the pressure and the mechanical vibration are applied by the tool to a coupling face within the recess.

11. The method according to claim 1, wherein the anchoring portion comprises a proximally-facing coupling face in a vicinity of the head portion, and wherein the step of pressing and coupling vibration energy into the joining element comprises pressing the tool against the coupling face of the anchoring portion.

12. The method according to claim 11, wherein the anchoring portion comprises an anchoring portion body and at least one protrusion facing distally away from the anchoring portion body.

13. The method according to claim 12, wherein the opening comprises an opening lateral wall and an opening ground terminating the opening distally, and wherein during the step of pressing and coupling the vibration energy into the joining element the at least one protrusion is pressed through a surface of the opening ground.

14. The method according to claim 12, wherein the at least one protrusion is arranged essentially at lateral positions of the coupling face.

15. The method according to claim 11, wherein the step of pressing and coupling vibration energy into the joining element is carried out until the coupling face is flush with a surface of the object or is below this surface.

16. The method according to claim 1, wherein the joining element is one-piece and consists of the thermoplastic material.

17. The method according to claim 1, further comprising providing, in the step of providing the joining element, the joining element comprising a liquefiable part that comprises the thermoplastic material, and a non-liquefiable part.

18. The method according to claim 17, wherein at least a part of the head portion that comprises at least a portion of the structured lateral outer surface is formed by the non-liquefiable part.

19. The method according to claim 17, wherein the structured lateral outer surface of the head portion is made of the thermoplastic material, and wherein the non-liquefiable part is an insert element integrated in the liquefiable part.

20. The method according to claim 17, wherein the non-liquefiable part comprises a proximally facing coupling surface, wherein in the step of pressing the joining element towards a distal direction and coupling mechanical vibration energy into the joining element the tool is pressed against the coupling surface while it is subject to vibrations.

21. The method according to claim 20, wherein the coupling face is offset with respect to a proximal end face of the joining element.

22. The method according to claim 21, wherein the head portion comprises a recess in the proximal end face, and the coupling face is arranged at the bottom of the recess.

23. The method according to claim 22, wherein the recess has an aspect ratio of at least 0.5.

24. The method according to claim 20, wherein the non-liquefiable part comprises a coupling plate and a spike portion extending distally therefrom.

25. The method according to claim 17, wherein the liquefiable part and the non-liquefiable part are coupled or couplable together by at least one of:
- a press fit;
- an adhesive bond;
- interpenetration of structures the non-liquefiable part by material of the liquefiable part so that a positive-fit connection results.

26. The method according to claim 17, further comprising providing the joining element as an integral, pre-manufactured element that comprises the liquefiable part and the non-liquefiable part.

27. The method according to claim 17, further comprising providing the liquefiable part and the non-liquefiable part of the joining element as separate parts and further comprising assembling the liquefiable part and the non-liquefiable part during the step of pressing and coupling vibration energy into the joining element and/or after this step.

28. The method according to claim 27, comprising causing a further portion of the material of the liquefiable part, by the effect of the vibration energy and the pressing that cause the interpenetration of the thermoplastic material into structures of the object, to be liquefied and to penetrate into structures of then non-liquefiable part to yield, after re-solidification, a positive-fit connection between the liquefiable part and the non-liquefiable part.

29. The method according to claim 1, wherein a proximal end face of the joining element comprises a guiding hole, and wherein in the step of positioning, a guiding protrusion of the tool is inserted to cooperate with the guiding hole.

30. The method according to claim 1, wherein in the step of coupling mechanical vibration energy into the joining element, the tool is caused to vibrate with a frequency between 10 kHz and 50 kHz.

31. The method according to claim 1, wherein in the step of pressing, a mechanical pressure of at least $10^5$ N/m$^2$ is applied by the tool to the joining element.

32. The method according to claim 1, comprising the further step of placing a mould tool relative to the head portion so that the lateral outer surface is at least partially in contact with a mould surface portion being a negative of the lateral outer surface and maintaining the physical contact between the mould tool and the head portion during at least a portion of the pressing.

33. A joining element for being anchored, with the aid of a thermoplastic material and mechanical vibration, in an object of material penetrable by the liquefied thermoplastic material, the joining element comprising an anchoring portion for in-depth anchoring in the object, and a head portion proximally of the anchoring portion, the joining element comprising a thermoplastic material at least on a surface of the anchoring portion, wherein at least one of the following conditions is met:
- the head portion comprises a proximal protrusion a radial extension of which is smaller than the radial extension of the head portion;
- the head portion comprises a recess open to the proximal side, the recess having a width sufficient for a tool to engage the joining element within the recess to couple mechanical vibration into the joining element, so that that portions of the thermoplastic material near the surface of the anchoring portions liquefy while a lateral outermost surface portion of the head portion remains intact;
- the joining element comprises a liquefiable part and a non-liquefiable part and the non-liquefiable part forms a proximally facing coupling-in face for coupling the mechanical vibration into the joining element by a tool;
- the anchoring portion comprises an anchoring portion body and at least one protrusion facing distally away from the anchoring portion body, wherein the anchoring portion body forms a proximally-facing coupling face in a vicinity of the head portion.

34. An assembly, comprising the joining element of claim 33 and further comprising a tool adapted to a proximally facing coupling face of the joining element and capable of coupling the mechanical vibration into the joining element.

35. A joining element for being anchored, with the aid of a thermoplastic material and mechanical vibration, in an object of material penetrable by the liquefied thermoplastic material, the joining element comprising a shaft for serving as an anchoring portion for in-depth anchoring in the object, and a head portion with a distally facing shoulder or a border line between the head portion and the anchoring portion, the head portion having a lateral outer surface with a well-defined structure, the lateral outer surface comprising at least one ridge or at least one groove or both, at least one ridge and at least one groove, the joining element comprising a thermoplastic material at least on a surface of the anchoring portion, wherein at least one of the following conditions is fulfilled:
- the head portion comprises a recess open to a proximal end, the recess extending axially substantially through the entire head portion;
- the anchoring portion comprises at least one groove running in axial direction, the groove having a depth of at least 15% of an average shaft diameter.

36. The joining element according to claim 35 with the head portion comprising a recess open to a proximal end, wherein a lateral extension of the recess amounts to at least 40% of a head diameter of the head portion and an axial extension of the recess amounts to at least 80% of an axial extension of the head portion.

37. The joining element according to claim 35, the anchoring portion comprising a plurality of grooves on lateral sides of the shaft.

38. The joining element according to claim 37, wherein the grooves are arranged on opposite lateral sides of the shaft in a staggered arrangement.

39. The joining element according to claim 38, wherein the shaft, in a section perpendicular to a proximodistal shaft axis, has an essentially S-shaped cross section.

40. An apparatus for carrying out the method according to claim 1, the apparatus comprising a joining element positioner, a holding device for holding the object and a sonotrode for pressing the joining element towards a distal direction and at the same time coupling mechanical vibration energy into the joining element in an amount and for a time sufficient for liquefaction of a portion of the thermoplastic material to cause interpenetration of the thermoplastic material into structures of the object, the apparatus being configured to leave the lateral outer surface of the head portion intact.

41. The apparatus according to claim 40, being configured to stop a forward movement of the sonotrode relative to the object as soon as a predetermined condition is met.

42. The apparatus according to claim 41, wherein the predetermined condition is that an outcoupling face of the sonotrode has reached a position at a predetermined distance from the object.

43. The apparatus according to claim 42, the apparatus further comprising a distance sensor adapted for sensing the distance between the sonotrode and the object.

44. The apparatus according to claim 40, further comprising a mould tool configured to be placed relative to the head portion when the anchoring portion reaches into the opening, so that the lateral outer surface is at least partially in contact with a mould surface portion being a negative of the lateral outer surface.

* * * * *